(12) United States Patent
Endo et al.

(10) Patent No.: US 11,461,118 B2
(45) Date of Patent: Oct. 4, 2022

(54) FLOW-BASED PROGRAMMING ENVIRONMENT FOR PERSISTENT EXECUTION AND RECOVERY

(71) Applicants: KABUSHIKI KAISHA TOSHIBA, Tokyo (JP); TOSHIBA DIGITAL SOLUTIONS CORPORATION, Kawasaki (JP)

(72) Inventors: Kotaro Endo, Shinjuku Tokyo (JP); Hiroshi Nakajima, Nishitokyo Tokyo (JP)

(73) Assignees: KABUSHIKI KAISHA TOSHIBA, Tokyo (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 316 days.

(21) Appl. No.: 16/716,578

(22) Filed: Dec. 17, 2019

(65) Prior Publication Data

US 2020/0125379 A1 Apr. 23, 2020

Related U.S. Application Data

(63) Continuation of application No. PCT/JP2017/034647, filed on Sep. 26, 2017.

(30) Foreign Application Priority Data

Jun. 21, 2017 (JP) .............................. JP2017-121052

(51) Int. Cl.
*G06F 9/455* (2018.01)
*G06F 8/34* (2018.01)
(Continued)

(52) U.S. Cl.
CPC ............ *G06F 9/45533* (2013.01); *G06F 8/34* (2013.01); *G06F 9/45558* (2013.01); *G06F 8/60* (2013.01); *G06F 9/455* (2013.01)

(58) Field of Classification Search
CPC ........ G06F 8/34; G06F 9/455; G06F 11/1446; G06F 11/1451; G06F 11/1469; G06F 11/1471; G06F 2201/84
See application file for complete search history.

(56) References Cited

U.S. PATENT DOCUMENTS 10,318,404 B2 *  6/2019  Glistvain ............ G06F 11/3664
2001/0047394 A1 * 11/2001  Kloba .................... H04L 67/04
                                                            709/217
(Continued)

FOREIGN PATENT DOCUMENTS

JP          2016-024794         2/2016

OTHER PUBLICATIONS

International Search Report and Written Opinion for International Application Serial No. PCT/JP2017/034647 dated Dec. 12, 2017, 6 pages.

*Primary Examiner* — Lewis A Bullock, Jr.
*Assistant Examiner* — Gilles R Kepnang
(74) *Attorney, Agent, or Firm* — Amin, Turocy & Watson, LLP

(57) ABSTRACT

A function node control unit records a pair of an input message and a computer program as a journal log, and sends the input message and the computer program to a virtual machine unit. The virtual machine unit executes the computer program with the input message as an argument, and sends the execution result to the function node control unit. The function node control unit outputs the execution result as an output message. At the time of activation of the information processing device, a recovery unit restores the virtual machine unit to the state at a particular time in the past; sequentially fetches journal logs recorded after the particular time; causes the virtual machine unit to sequentially re-execute the computer programs with the input messages included in the respective journal logs as corresponding arguments; and roll-forwards the state of the virtual machine unit to the latest state.

11 Claims, 21 Drawing Sheets

(51) Int. Cl.
*G06F 8/60* (2018.01)
*G06F 11/14* (2006.01)

(56) References Cited

U.S. PATENT DOCUMENTS

| | | | |
|---|---|---|---|
| 2007/0157185 A1* | 7/2007 | Semerdzhiev | G06F 9/455 |
| | | | 717/148 |
| 2009/0313503 A1* | 12/2009 | Atluri | G06F 11/1453 |
| | | | 714/19 |
| 2011/0010642 A1* | 1/2011 | Nagai | G06F 9/455 |
| | | | 715/760 |
| 2013/0086549 A1* | 4/2013 | Riehl | G06F 9/45516 |
| | | | 717/108 |
| 2016/0092251 A1* | 3/2016 | Wagner | G06F 11/301 |
| | | | 718/1 |
| 2016/0291942 A1* | 10/2016 | Hutchison | G06F 8/34 |
| 2016/0357521 A1* | 12/2016 | Zhang | G06F 8/34 |
| 2017/0024290 A1* | 1/2017 | Kaulgud | G06F 11/1479 |
| 2017/0060726 A1* | 3/2017 | Glistvain | G06F 11/362 |

* cited by examiner

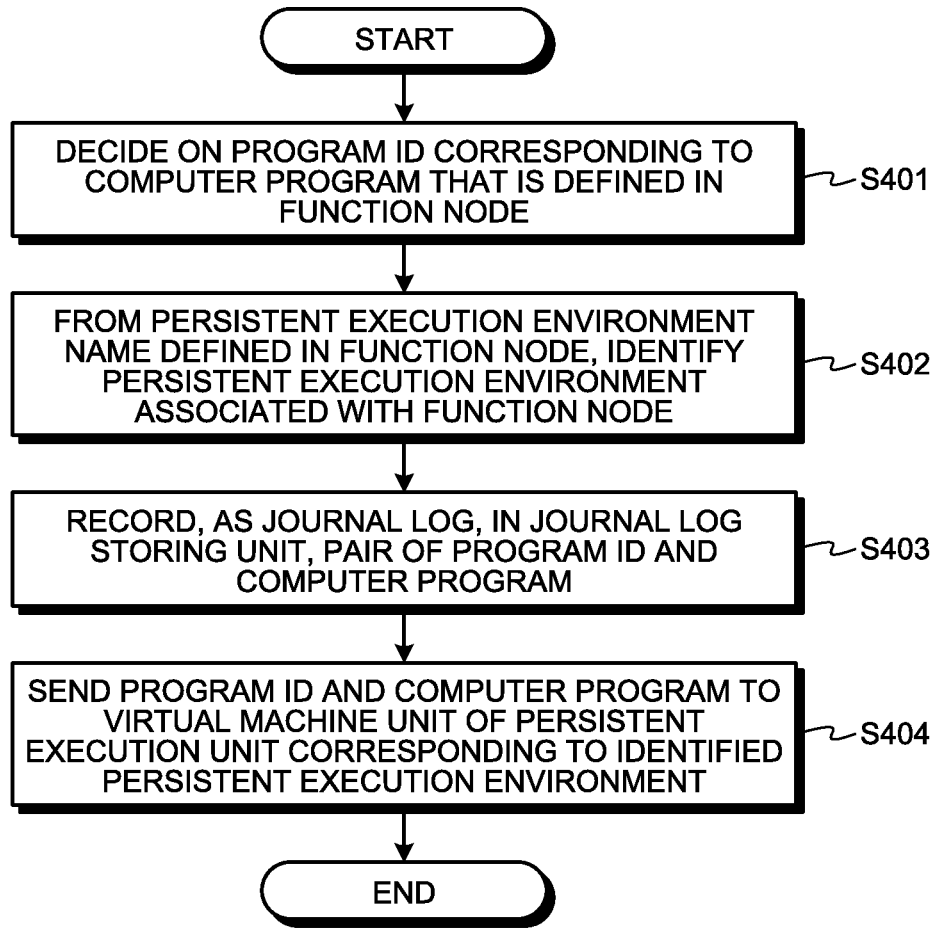

FLOW-BASED PROGRAMMING ENVIRONMENT FOR PERSISTENT EXECUTION AND RECOVERY

CROSS-REFERENCE TO RELATED APPLICATIONS

This application is a continuation of PCT International Application No. PCT/JP2017/034647 filed on Sep. 26, 2017, which designates the United States, incorporated herein by reference and which claims the benefit of priority from Japanese Patent Application No. 2017-121052, filed on Jun. 21, 2017, incorporated herein by reference.

FIELD

Embodiments described herein relate generally to an information processing device, an information processing system, an information processing method, and a computer program product.

BACKGROUND

For example, as a method for designing/implementing the operations of IoT devices, flow-based programming (hereinafter, called "FBP") is widely used. The FBP is a program development approach for creating a flow of operations by linking message-driven software components (called "nodes"). For example, open source tools such as Node-RED have been proposed as the FBP.

In the case of using the FBP in creating computer programs of a device that requires persistency, since the FBP execution environment does not have persistency, it becomes necessary to store the states of the device in an external database. Moreover, at the time of activating the device (including recovering from a failure) or in the case of using the persistent state of the device, the state of the device needs to be restored by reading a state stored in the external database. Hence, for example, there arises a need to add an artificial flow for achieving persistency to the original dataflow, such as adding a special node called a database node for establishing connection with the database and performing search/updating. That becomes the burden in the program development.

It is an object of the present invention to provide an information processing device, an information processing system, an information processing method, and a computer program product that enable achieving persistency in the FBP execution environment.

BRIEF DESCRIPTION OF THE DRAWINGS

FIG. 11 is a flowchart for explaining exemplary operations performed by the function node control unit;
FIG. 12 is a diagram illustrating an exemplary correspondence table of program IDs and compiled computer programs.

DETAILED DESCRIPTION

Figure 1:
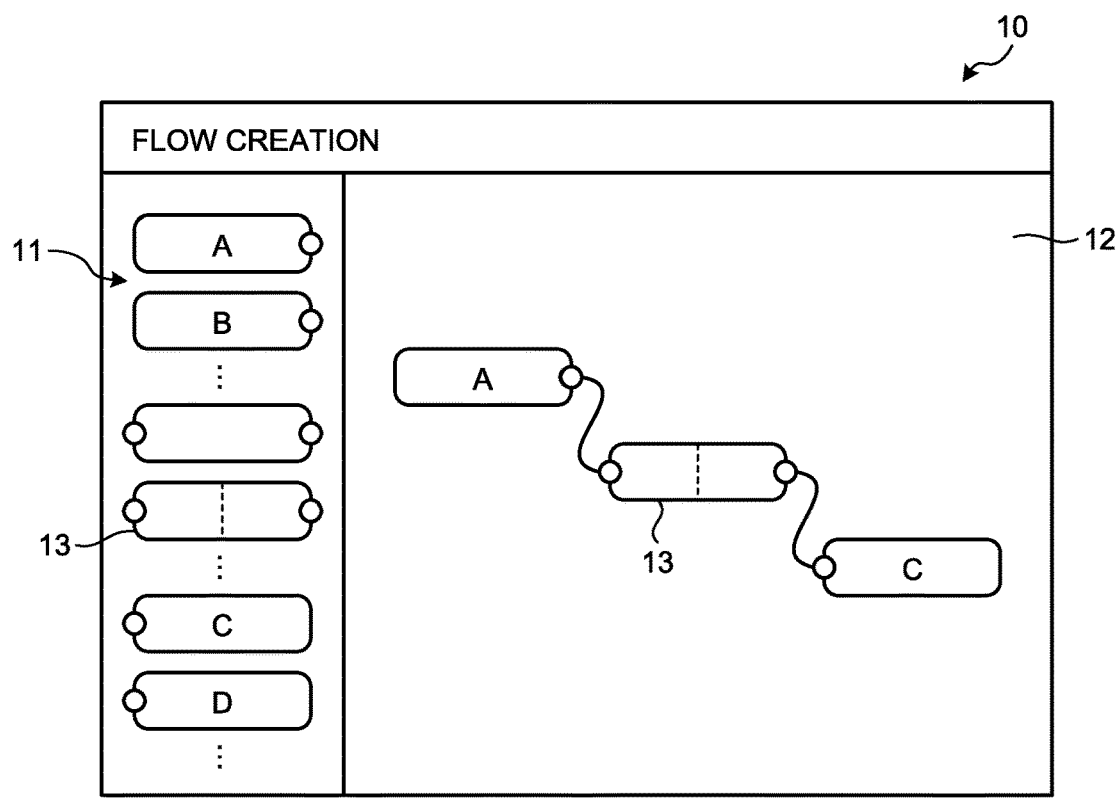
FIG. 1 illustrates an example of a flow creation UI.

An information processing device serving as a flow-based programming execution environment includes a function node control unit and a persistent execution unit. The function node control unit is disposed in a corresponding manner to a function node which is deployed from a programming environment. The persistent execution unit is associated with the function node and is disposed in a corresponding manner to a persistent execution environment which is deployed from the programming environment. The persistent execution unit includes a virtual machine unit and a recovery unit. When an input message of the function node is input, the function node control unit records, as a journal log, a pair of the input message and a computer program defined in the function node, and sends the input message and the computer program to the virtual machine unit. The virtual machine unit executes the computer program with the input message as an argument, and sends an execution result to the function node control unit. The function node control unit outputs the execution result, which is received from the virtual machine unit, as an output message.

At time of activation of the information processing device, the recovery unit restores the virtual machine unit to a state at a particular time in the past, sequentially fetches journal logs recorded after the particular time, causes the virtual machine unit to sequentially re-execute computer programs, each of which constitutes one of the journal logs, with the input message constituting the journal log as an argument, and roll-forwards the virtual machine unit to a latest state.

In the embodiments described below, as an example of an information processing device in which the present invention is implemented, it is assumed to use an IoT device called a gateway. A gateway has the role of collecting data from surrounding sensors and transferring that data to a server device upon appropriate processing; and has the role of controlling surrounding IoT devices based on operating instructions issued by the server device.

A gateway has the hardware resources of a general-purpose computer and is customized software-wise according to the situation. That customization is performed using the FBP. As a result of expressing the connection status with various surrounding devices as a flow using the FBP, it is possible to perform customization in a visually easy-to-understand manner. The details about the data processing performed in the gateway are defined using a processing node called a function node.

The processing nodes are software components constituting the flow in the FBP, and generally have a single input port and a plurality of output ports. The output ports are linked to the input ports of other processing nodes. From among the processing nodes, the software component that makes JavaScript (registered trademark) programs user-definable is a function node. As a result of defining the details of the data processing in the gateway using the function node, the operations of the gateway can be customized in an arbitrary manner.

A standard execution environment of the FBP does not have persistency. In that regard, in the embodiments, the FBP is equipped with a built-in capability of a virtual machine of JavaScript that is called a persistent execution environment, and thus persistency is achieved in the FBP execution environment. Herein, a virtual machine represents an independent execution environment of JavaScript, has a unique global scope, and the implicit actions of the computer programs executed in that global scope have no effect on the outside. The persistent execution environment is not associated with the processing nodes, but is made available by associating it to the function node as the environment in which the function node is executed.

Given below is the explanation of operations performed for creating a flow in the programming environment of the FBP according to the embodiments. For example, the FBP-based flow according to the embodiments is created according to the user operations performed in a browser-based user interface (UI). In FIG. 1 is illustrated an example of a flow creation UI 10 in the FBP according to the embodiments. The flow creation UI 10 includes a node list area 11 and a flow creation area 12. The icons of a plurality of nodes listed in the node list area 11 can be placed in the flow creation area 12 by performing, for example, drag-and-drop operations, and then the desired flow can be created by linking the icons of a plurality of nodes placed in the flow creation area 12. In the node list area 11, an icon 13 of the function node is listed that can be associated with the persistent execution environment, and the flow can be created using the function node.

Figure 2:
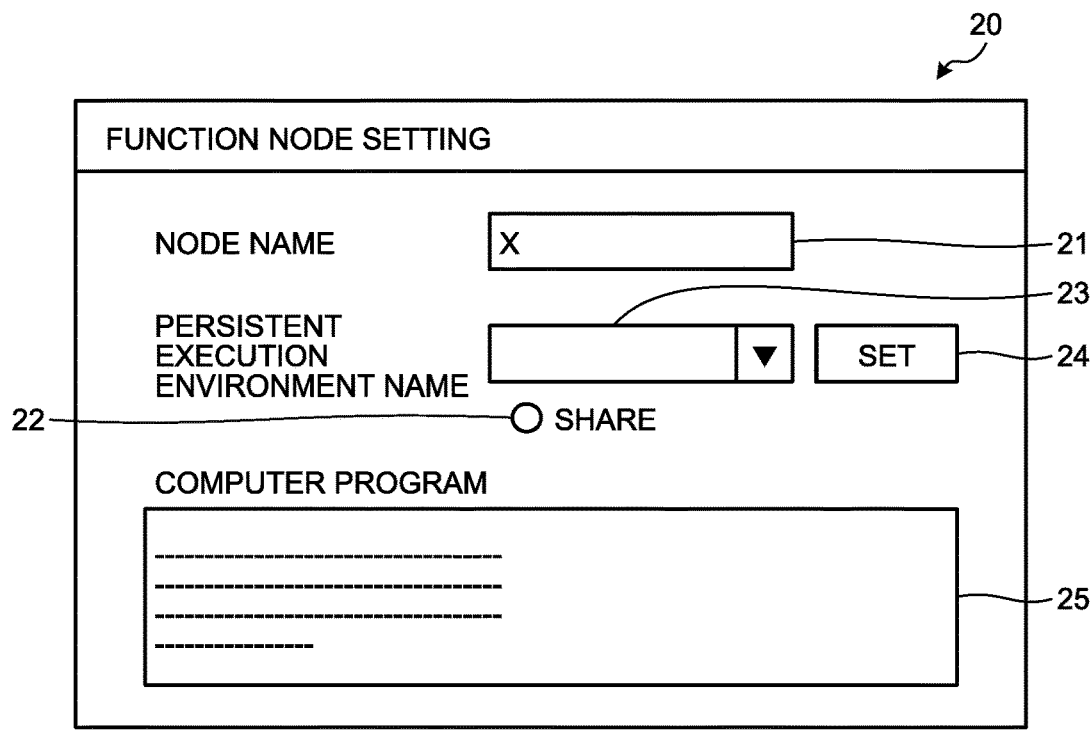
FIG. 2 is a diagram illustrating an example of a function node setting UI.

In the flow creation area 12 of the flow creation UI 10, when an operation such as double clicking is performed with respect to the icon 13 of the function node constituting the flow; for example, a function node setting UI 20 gets displayed as illustrated in FIG. 2. The function node setting UI 20 includes a text box 21 for writing the node name of the function name; a checkbox 22 that is ticked off if the persistent execution environment is to be shared with other function nodes; a pulldown menu 23 for selecting the persistent execution environment to be shared with other function nodes when the checkbox 22 is ticked off; a "set" button 24 that is pressed when the persistent execution environment is to be newly set; and a program description area 25 in which the description of the computer program of the function node is written. In the function node setting UI 20, the user can define the node name of the function node, specify the persistent execution environment to be associated with the function node, and define the computer program of the function node. As a result, the user can set the function node that constitutes the flow.

Figure 3:
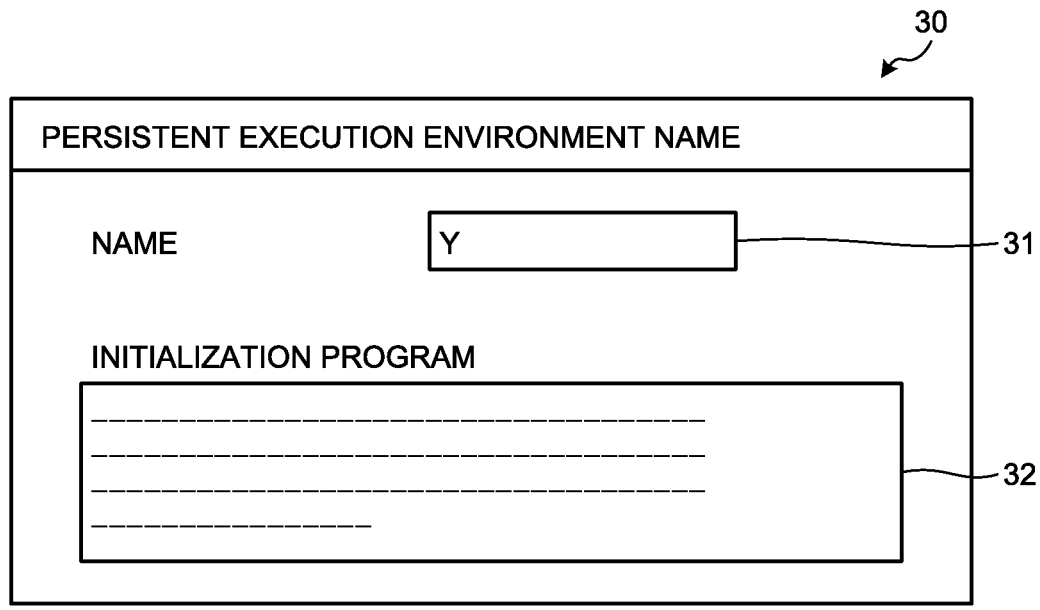
FIG. 3 is a diagram illustrating an example of a persistent execution environment setting UI.

When the "set" button 24 of the function node setting UI 20 is pressed, for example, a persistent execution environment setting UI 30 gets displayed as illustrated in FIG. 3. The persistent execution environment setting UI 30 includes a text box 31 for writing the name of the persistent execution environment; and a program description area 32 for writing the description of an initialization program of the persistent execution environment. Thus, by defining the name and the initialization program of a persistent execution environment in the persistent execution environment setting UI 30, the user can newly set the persistent execution environment to be used by the function node.

Figure 4:
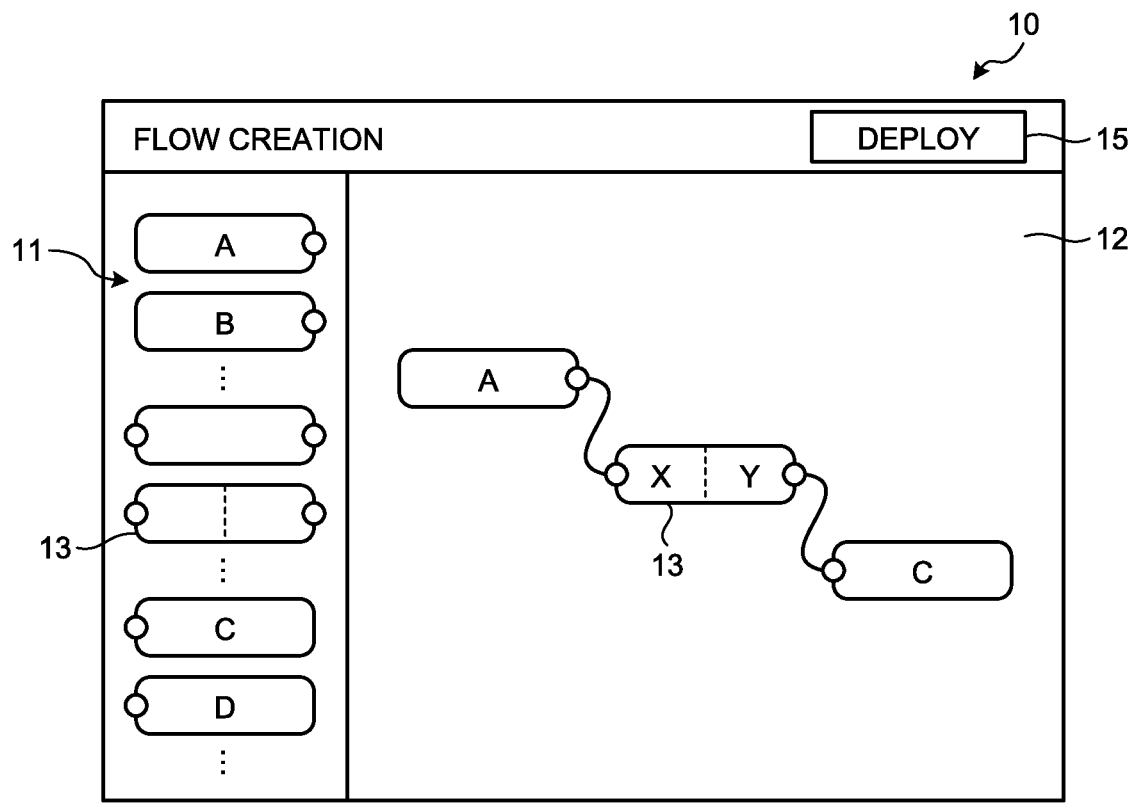
FIG. 4 is a diagram illustrating an example of the flow creation UI.

When the setting of the function node, which constitutes the flow, is completed; the flow creation UI 10 is again displayed as illustrated in FIG. 4; and the node name of the function node constituting the flow and the persistent execution environment corresponding to that function node are reflected in the icon 13 of the function node. Moreover, in the flow creation UI 10, a "deploy" button 15 is displayed. When the "deploy" button 15 is pressed, the function node constituting the flow and the persistent execution environment corresponding to that function node are deployed at the specified deployment destination.

The information processing device according to the embodiments is an information processing device serving as the FBP execution environment, and executes the computer program of the deployed function node in the persistent execution environment. Given below is the detailed explanation of an information processing device, an information processing system, an information processing method, and a computer program according to the embodiments. In the following explanation, the constituent elements having identical functions are referred to by the same reference numerals, and their explanation is not repeated.

First Embodiment

Figure 5:
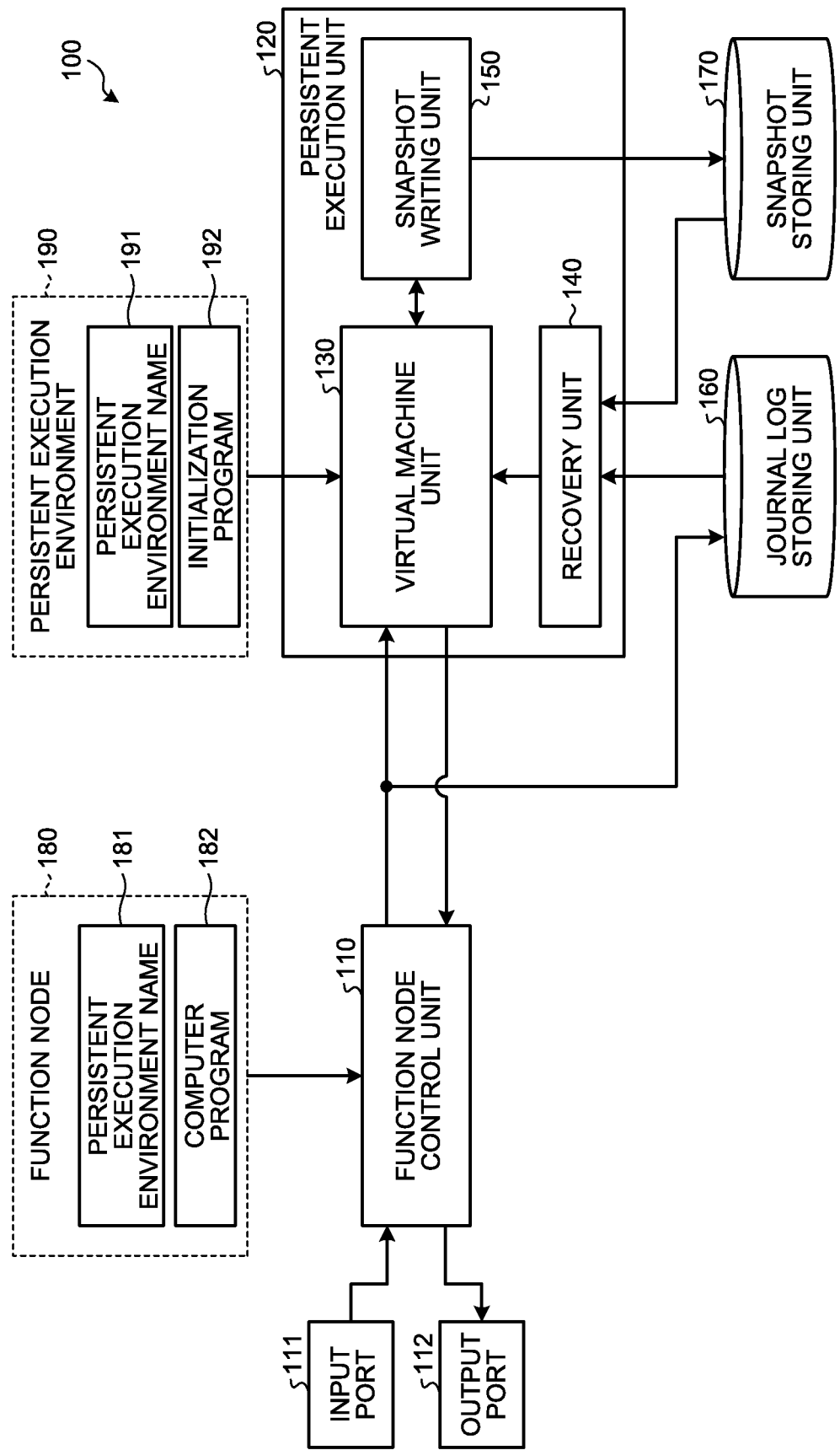
FIG. 5 is a block diagram illustrating an exemplary functional configuration of an information processing device according to a first embodiment.

FIG. 5 is a block diagram illustrating an exemplary functional configuration of an information processing device 100 according to a first embodiment. The information processing device 100 includes one or more function node control units 110 and one or more persistent execution units 120. Each persistent execution unit 120 includes a virtual machine unit 130, a recovery unit 140, and a snapshot writing unit 150. Meanwhile, the information processing device 100 further includes a journal log storing unit 160 and a snapshot storing unit 170. The journal log storing unit 160 and the snapshot storing unit 170 either can be disposed for each persistent execution unit 120 or can be shared among a plurality of persistent execution units 120.

Each function node control unit 110 is disposed corresponding to a function node 180 that is deployed in the information processing device 100 from the programming environment of the FBP, and each persistent execution unit 120 is disposed corresponding to a persistent execution environment 190 that is deployed in the information processing device 100 from the programming environment of the FBP. In FIG. 5, only a single function node control unit 110 is illustrated corresponding to a single function node 180, and only a single persistent execution unit 120 is illustrated corresponding to a single persistent execution environment 190. However, the function node control unit 110 is disposed for each deployed function node 180. Thus, when a plurality of function nodes 180 is deployed, a plurality of function node control units 110 is disposed corresponding to the function nodes 180. Moreover, the number of the persistent execution units 120 is equal to the number of the persistent execution environments 190 that are deployed corresponding to the function nodes 180. As described above, the persistent execution unit 120 corresponding to the persistent execution environment 190, which is shared among a plurality of function nodes 180, is used by a plurality of function node control units 110 corresponding to the function nodes 180 sharing the persistent execution environment 190. Moreover, the persistent execution unit 120 corresponding to the persistent execution environment 190, which is used exclusively by a single function node 180, is used only by the function node control unit 110 corresponding to that function node 180.

The function node 180 that is deployed from the programming environment of the FBP includes a persistent execution environment name 181 and a computer program 182 that are user-defined. The persistent execution environment 190 that is deployed from the programming environment of the FBP includes a persistent execution environment name 191 and an initialization program 192 that are user-defined. In the first embodiment, the association between the function node 180 and the persistent execution environment 190 is implemented using the name of the persistent execution environment 190. That is, in each function node 180 and the corresponding persistent execution environment 190, the user-defined persistent execution environment name 181 matches with the user-defined persistent execution environment name 191.

Figure 6:
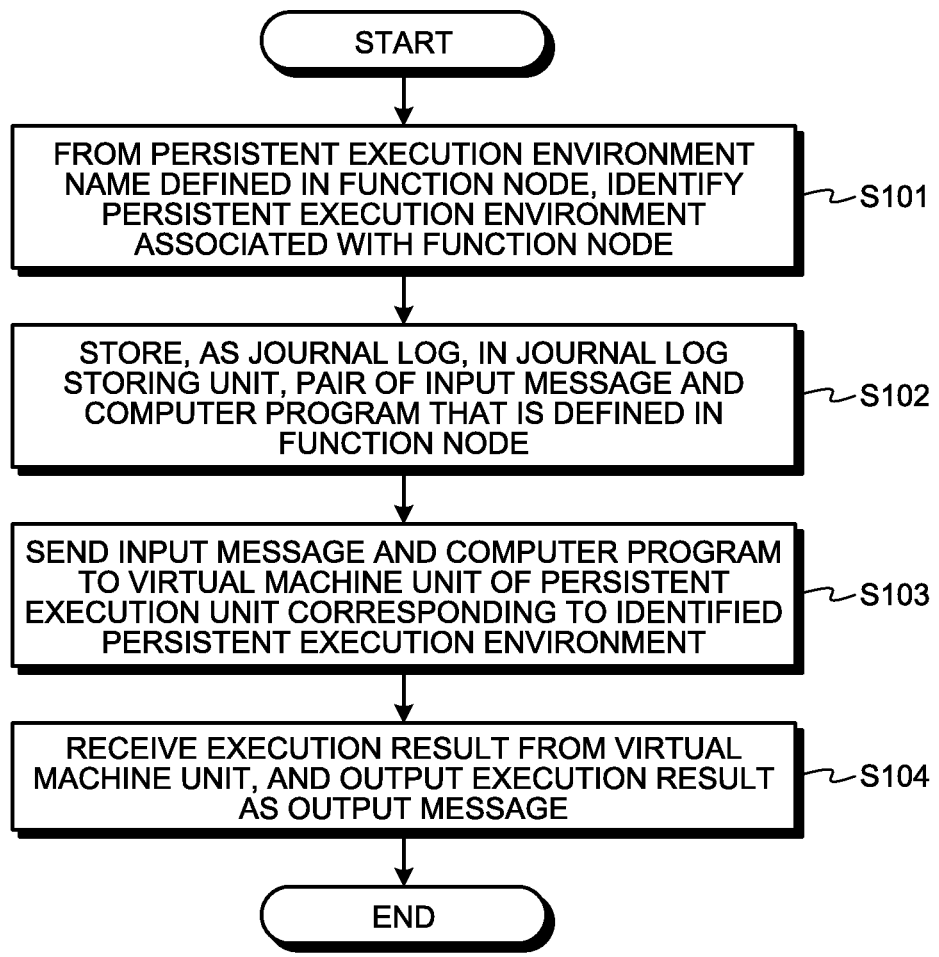
FIG. 6 is a flowchart for explaining exemplary operations performed by a function node control unit.

The function node control unit 110 is a control unit for implementing the functions of the function node 180 using the persistent execution unit 120. In FIG. 6 is illustrated exemplary operations performed by the function node control unit 110. The series of operations illustrated in the flowchart in FIG. 6 are performed by the function node control unit 110 in a repeated manner every time an input message of the function node 180 is input to an input port 111.

When an input message of the function node 180 is input to the input port 111; firstly, the function node control unit 110 uses the persistent execution environment name 181, which is defined in the function node 180, as the key and identifies the persistent execution environment 190 corresponding to the function node 180 (Step S101). Then, the function node control unit 110 records, as a journal log in the journal log storing unit 160, the pair of the input message input from the input port 111 and the computer program 182 defined in the function node 180 (Step S102). Moreover, the function node control unit 110 sends the input message and the computer program 182 to the virtual machine unit 130 of the persistent execution unit 120 corresponding to the persistent execution environment 190 identified at Step S101 (Step S103). Subsequently, when the execution result of the computer program 182 is sent by the virtual machine unit 130, the function node control unit 110 receives the execution result from the virtual machine unit 130 and outputs it as an output message from an output port 112 (Step S104).

Figure 7:
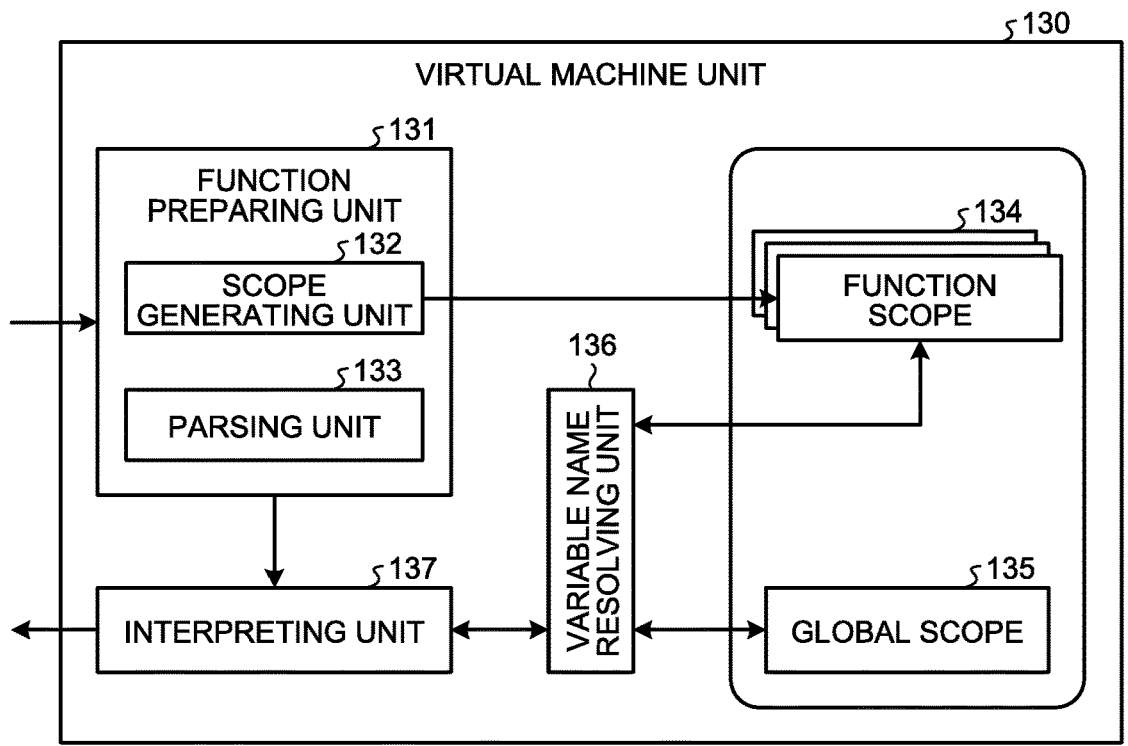
FIG. 7 is a block diagram illustrating the details of a virtual machine unit.

When the virtual machine unit 130 receives the input message and the computer program 182 from the function node control unit 110, it executes the computer program 182 with the input message serving as the argument, and sends the execution result to the function node control unit 110. FIG. 7 is a block diagram illustrating the details of the virtual machine unit 130. The virtual machine unit 130 includes a function preparing unit 131, an interpreting unit 137, and a variable name resolving unit 136. The function preparing unit 131 includes a scope generating unit 132 and a parsing unit 133.

The scope generating unit 132 generates a function scope 134 before the execution of the computer program 182 that is sent by the function node control unit 110. The function scope 134 represents the variable storage area generated at each instance of execution of the computer program 182, and is accessible only from the inside of the computer program 182. When the computer program 182 is no more used on account of being completely executed, the function scope 134 ceases to exist. The virtual machine unit 130 parses the computer program 182, which is sent by the function node control unit 110, using the parsing unit 133; and resisters the variables, which are declared in the computer program 182, in the function scope 134 generated by the scope generating unit 132. Moreover, the virtual machine unit 130 registers reserved variables of the function node 180 in the function scope 134. For example, the virtual machine unit 130 registers a reserved variable "msg", which is for storing the input message sent by the function node control unit 110, in the function scope 134; and also registers the value of the reserved variable (i.e., the input message that was sent).

Furthermore, the virtual machine unit 130 holds a unique global scope 135 that represents such a single variable storage area in the virtual machine unit 130 which is accessible from any scope. The virtual machine unit 130 executes the initialization program 192 of the persistent execution environment 190 in the global scope 135, and thus registers the variables declared in the initialization program 192 in the global scope 135. Moreover, the virtual machine unit 130 also registers the reserved variables of the persistent execution environment 190 in the global scope 135. Meanwhile, the initialization program 192 of the persistent execution environment 190 is executed only when the entire information processing device 100 is to be initialized in response to an explicit instruction for initialization issued by the user immediately after the deployment of the persistent execution environment 190. Thus, at the time of activating the information processing device 100, the persistent execution environment 190 is not executed.

Figure 8:
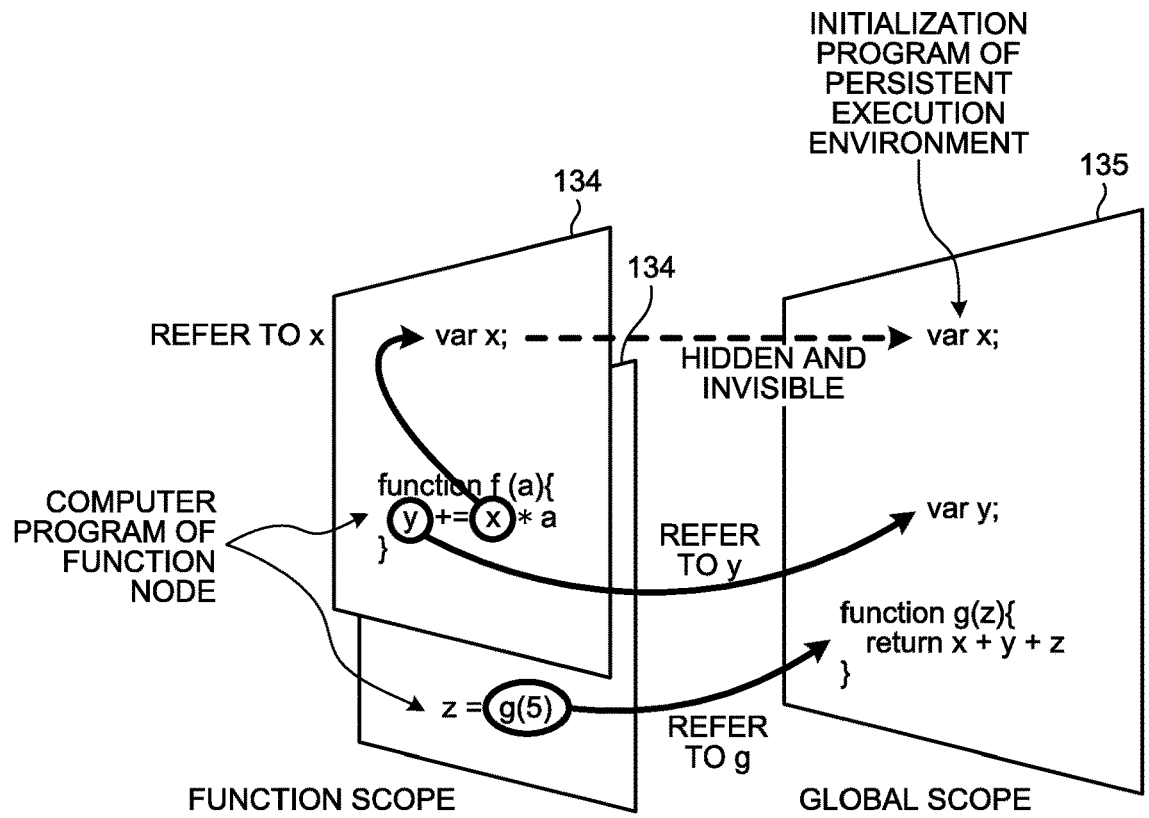
FIG. 8 is a diagram for explaining the scope rules set in the virtual machine unit.

FIG. 8 is a diagram for explaining the scope rules set in the virtual machine unit 130. At the time of executing the computer program 182 of the function node 180, regarding a variable (a variable x illustrated in FIG. 8) registered in the function scope 134, the value of the variable x is referred to in the function scope 134. On the other hand, regarding a variable (a variable y illustrated in FIG. 8) that is neither declared in the computer program 182 of the function node 180 nor registered in the function scope 134, the value of the variable y is referred to in the global scope 135. Moreover, also regarding a function (a function g illustrated in FIG. 8) not registered in the function scope 134, the global scope 135 is referred to.

When the preparation for executing the computer program 182 is completed by the function preparing unit 131, the virtual machine unit 130 uses the function scope 134; executes the computer program 182 using the interpreting unit 137; and sends the execution result to the function node control unit 110. During the execution of the computer program 182, if any variables are accessed, then the variable name resolving unit 136 performs operations.

Figure 9:
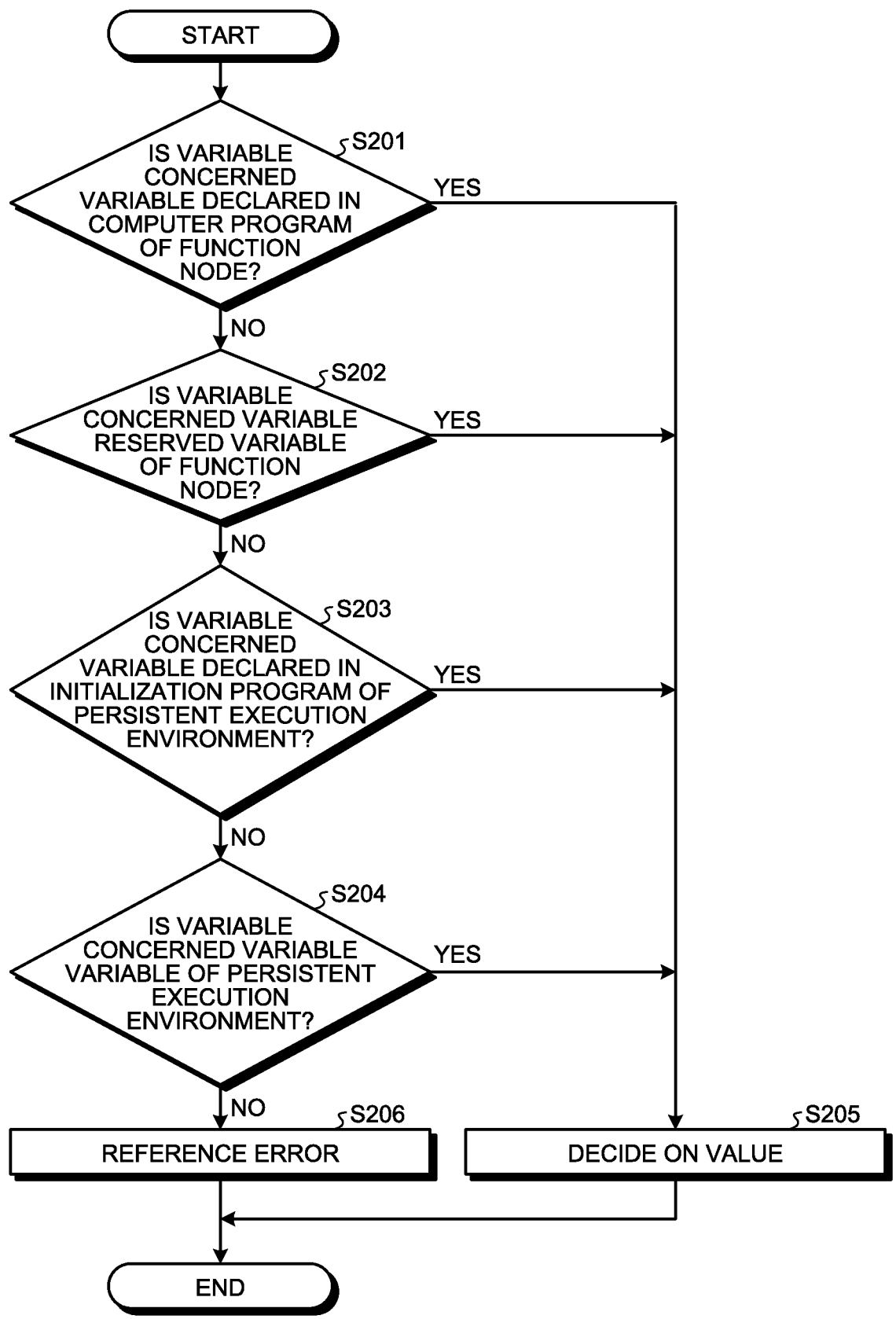
FIG. 9 is a flowchart for explaining exemplary operations performed by a variable name resolving unit.

FIG. 9 is a flowchart for explaining exemplary operations performed by the variable name resolving unit 136. When a variable is referred to from the computer program 182 of the function node 180; firstly, the variable name resolving unit 136 determines whether or not the concerned variable has been declared in the computer program 182 (Step S201). If the concerned variable has been declared in the computer program 182 (Yes at Step S201), then the variable name resolving unit 136 refers to that variable registered in the function scope 134 and decides on the value (Step S205). On the other hand, if the concerned variable is not declared in the computer program 182 (No at Step S201), then the variable name resolving unit 136 subsequently determines whether or not the concerned variable is a reserved variable of the function node 180 (Step S202). If the concerned variable is a reserved variable of the function node 180 (Yes at Step S202), then the variable name resolving unit 136 refers to that variable registered in the function scope 134 and decides on the value (Step S205).

On the other hand, if the concerned variable is not a reserved variable of the function node 180 (No at Step S202), then the variable name resolving unit 136 subsequently determines whether or not the concerned variable has been declared in the initialization program 192 in the persistent execution environment 190 (Step S203). If the concerned variable has been declared in the initialization program 192 (Yes at Step S203), then the variable name resolving unit 136 refers to that variable registered in the global scope 135 and decides on the value (Step S205). On the other hand, if the concerned variable is not declared in the initialization program 192 (No at Step S203), then the variable name resolving unit 136 determines whether or not the concerned variable is a reserved variable of the persistent execution environment 190 (Step S204). If the concerned variable is a reserved variable of the persistent execution environment 190 (Yes at Step S204), then the variable name resolving unit 136 refers to that variable registered in the global scope 135 (Step S205). On the other hand, if the concerned variable is not a reserved variable of the persistent execution environment 190 (No at Step S204), then it results in a reference error (Step S206).

The state of the virtual machine unit 130 is periodically recorded as a snapshot in the snapshot storing unit 170. A snapshot implies binary data expressing the overall state of the virtual machine unit 130 at a particular time, and is periodically written by the snapshot writing unit 150 and recorded in the snapshot storing unit 170. The recorded snapshot is used by the recovery unit 140 (described later) for restoring the state of the virtual machine unit 130 to the state at a particular time in the past.

Since a snapshot has a relatively large data size, it is not desirable to frequently write and record snapshots. Hence, for example, assuming that the time period of about one second is allowed for roll-forwarding (described later), every time the net execution period of the virtual machine unit 130 reaches one second, the snapshot writing unit 150 writes a snapshot and records it in the snapshot storing unit 170.

When the information processing device 100 is activated after its power supply is turned off (including the case of recovering from a failure), the recovery unit 140 restores the state of the virtual machine unit 130 to the state prior to the disconnection in the power supply (i.e., to the latest state). At the time of activating the information processing device 100, the recovery unit 140 loads a snapshot, which is recorded in the snapshot storing unit 170, in the virtual machine unit 130 and restores the virtual machine unit 130 to the state at a particular time in the past; sequentially fetches the journal logs, which are recorded from that time onward, from the journal log storing unit 160; sequentially re-executes the computer program 182, in which the input messages constituting each concerned journal log serves as the argument, in the virtual machine unit 130; and roll-forwards the virtual machine unit 130 to the latest state. Meanwhile, the re-execution result of the computer program 182 is destroyed without being sent to the function node control unit 110.

Figure 10:
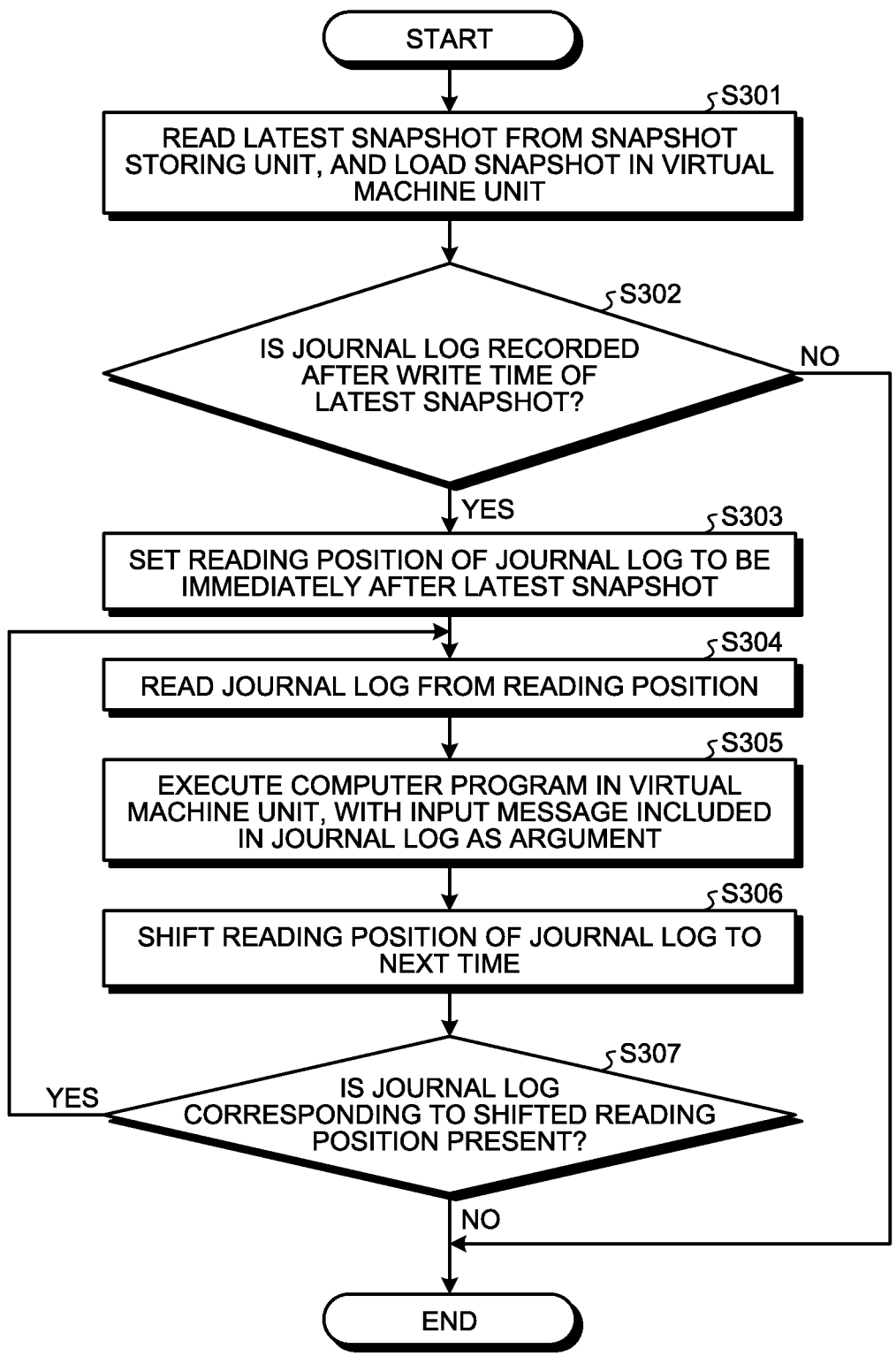
FIG. 10 is a flowchart illustrating exemplary operations performed by a recovery unit.

FIG. 10 is a flowchart illustrating exemplary operations performed by the recovery unit 140. At the time of activation of the information processing device 100; firstly, the recovery unit 140 reads the latest snapshot from the snapshot storing unit 170 and loads that snapshot in the virtual machine unit 130 (Step S301). Then, the recovery unit 140 confirms whether or not a journal log is recorded after the write time of the latest snapshot (Step S302). If a journal log is recorded after the write time of the latest snapshot (Yes at Step S302), then the reading position of the journal log is set to be immediately after the latest snapshot (Step S303). On the other hand, if no journal log is recorded after the write time of the latest snapshot (No at Step S302), the operations are ended.

Subsequently, the recovery unit 140 reads the journal log recorded at the set reading position from the journal log storing unit 160 (Step S304). Then, with the input message that constitutes the read journal log serving as the argument, the recovery unit 140 executes the computer program 182, which also constitutes the read journal log, in the virtual machine unit 130 (Step S305). Subsequently, the recovery unit 140 shifts the reading position of the journal log to the recording time of the next journal log (Step S306), and confirms whether or not the journal log corresponding to the shifted reading position is present (Step S307). If the journal log corresponding to the reading position is present (Yes at Step S307), then the system control returns to Step S304 and the subsequent operations are performed again. On the other hand, if the journal log corresponding to the reading position is not present (No at Step S307), the operations are ended.

Meanwhile, in the case of implementing the nonvolatile memory technology such as a magnetoresistive random access memory (MRAM) in the persistent execution unit 120; when the information processing device 100 is activated after having been switched off in a normal fashion, the state of the virtual machine unit 130 can be set to the latest state without needing the recovery unit 140 to perform the operations. However, even when the nonvolatile memory technology is implemented in the persistent execution unit 120, if the recovery unit 140 is made to perform operations at the time of recovering from a failure, it becomes possible to implement failure tolerance functions such as atomicity. Herein, a storage device is assumedly used for the journal log storing unit 160 and the snapshot storing unit 170. However, if the journal log storing unit 160 and the snapshot storing unit 170 are implemented using the nonvolatile memory technology such as an MRAM, then it is anticipated to achieve enhancement in the processing speed.

As described above with reference to specific examples, according to the first embodiment, persistency can be achieved in the information processing device 100 that serves as the FBP execution environment. That eliminates the conventional need to add an artificial flow for achieving persistency in the original dataflow, thereby enabling achieving enhancement in the efficiency of program development and improving the readability of computer programs. Moreover, since the persistent state is accessible as a JavaScript variable, the programming task becomes easier. Furthermore, the execution of the function node becomes atomic, thereby leading to enhancement in reliability.

Modification Example

The information processing device 100 according to the first embodiment can be optimized in various ways. That is, improvement in the performance can be achieved by performing some addition/modification to the configuration. As a modification example, an example is explained in which optimization is achieved by introducing the concept of program IDs for the computer programs. Meanwhile, apart from modification example explained below, optimization can be achieved with various existing technologies implementable by a person skilled in the art.

A program ID represents unique identification information assigned to the computer program 182 of each function node 180, and has a significantly smaller data size (for example, the byte length of 16) than the data size of the actual code representing the computer program 182. Hence, as a result of using the program ID in place of the computer program 182; the data size becomes smaller, which is effective in reducing the data volume and shortening the transfer time.

In the first embodiment, when the function node 180 is deployed in the information processing device 100, a user-defined program ID corresponding to the computer program 182 gets decided in the function node 180. Then, the function node control unit 110 records, as a journal log, the pair of the program ID and the computer program 182 in the journal log storing unit 160; and sends the pair of the program ID and the computer program 182 to the virtual machine unit 130 of the persistent executing unit 120. The pair of the program ID and the computer program 182 that is sent to the virtual machine unit 130 gets registered in the virtual machine unit 130. At that time, it is desirable that the virtual machine unit 130 parses the computer program 182; and stores the computer program 182, which is compiled according to the internal format, in a corresponding manner to the program ID. Meanwhile, when the computer program 182 of the function node 180 is changed, a new function node 180 including the changed computer program 182 gets deployed. Hence, identical operations are performed.

Moreover, in the first embodiment, when the input message of the function node 180 is input, instead of recording the pair of the input message and the computer program 182, the function node control unit 110 records the pair of the input message and the program ID as a journal log in the journal log storing unit 160. Then, the function node control unit 110 sends the input message and the program ID to the virtual machine unit 130 of the persistent execution unit 120. The virtual machine unit 130 executes the computer program 182 of the function node 180 by executing callScript (described later) with the input message and the program ID, which are sent by the function node control unit 110, serving as the arguments; and sends the execution result to the function node control unit 110.

Meanwhile, at the time of activation of the information processing device, when the virtual machine unit 130 is to be roll-forwarded to the latest state, the recovery unit 140 reads the journal log including the pair of the input message and the program ID from the journal log storing unit 160, and causes the virtual machine unit 130 to execute callScript with the input message and the program ID serving as the arguments.

In the following explanation, the sequence of operations performed by the function node control unit 110, the virtual machine unit 130, and the recovery unit 140 according to the modification example are explained with reference to flowcharts. FIG. 11 is a flowchart for explaining exemplary operations performed by the function node control unit 110 according to the modification example. In FIG. 11 is illustrated the flow of operations performed when the function node 180 is deployed in the information processing device 100.

When the function node 180 is deployed in the information processing device 100, the program ID, which is defined in the function node 180 in a corresponding manner to the computer program 182, gets decided (Step S401). Firstly, the function node control unit 110 uses the persistent execution environment name 181, which is defined in the function node 180, as the key and identifies the persistent execution environment 190 associated with the function node 180 (Step S402). Then, the function node control unit 110 records, as a journal log in the journal log storing unit 160, the pair of the program ID, which is decided at Step S401, and the computer program 182 (Step S403). Moreover, the function node control unit 110 sends the program ID and the computer program 182 to the virtual machine unit 130 of the persistent execution unit 120 corresponding to the persistent execution environment 190 identified at Step S402 (Step S404).

When the virtual machine unit 130 receives the program ID and the computer program 182 of the function node 180 from the function node control unit 110, it parses the computer program 182 using the parsing unit 133 and converts (compiles) the computer program 182 according to the internal format of the virtual machine unit 130. The complied computer program 182 gets registered in the virtual machine unit 130 in a corresponding manner to the program ID as illustrated in a correspondence table 138 illustrated in FIG. 12, for example.

Figure 13:
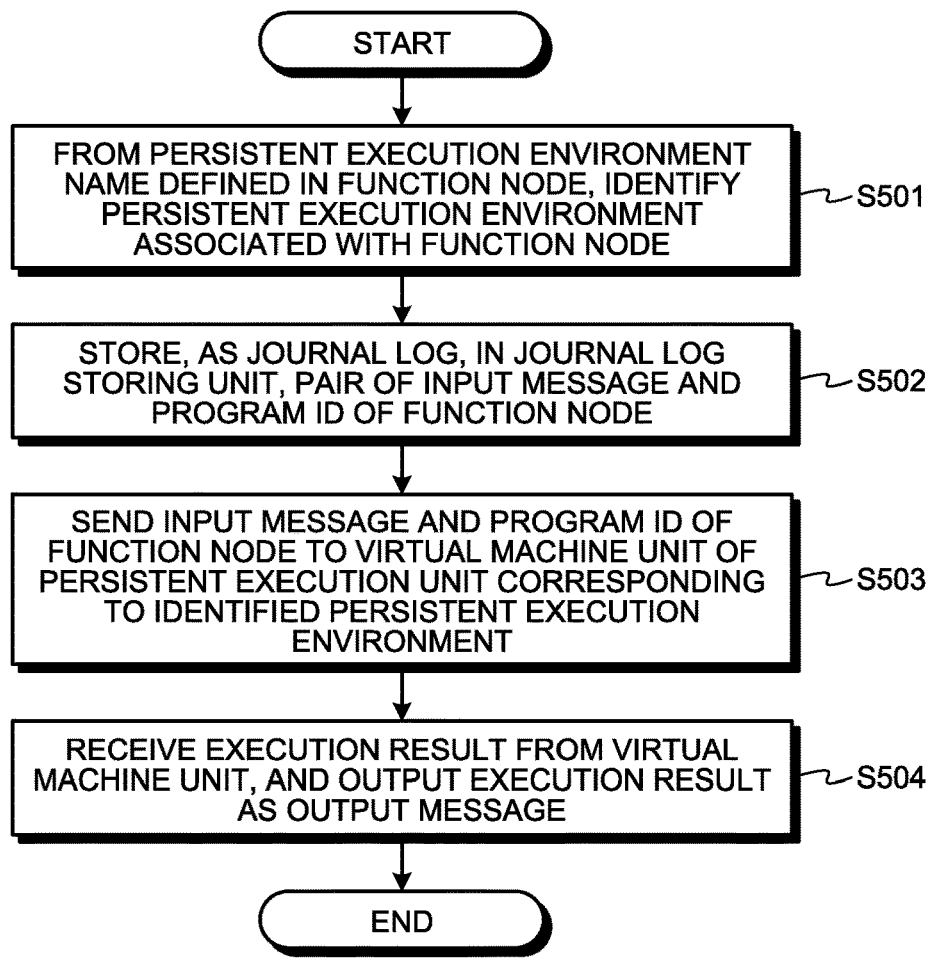
FIG. 13 is a flowchart for explaining exemplary operations performed by the function node control unit.

FIG. 13 is a flowchart for explaining exemplary operations performed by the function node control unit 110 according to the modification example. In FIG. 13 is illustrated the flow of operations performed when an input message is input to the function node 180. When an input message of the function node 180 is input to the input port 111; firstly, the function node control unit 110 uses the persistent execution environment name 181, which is defined in the function node 180, as the key and identifies the persistent execution environment 190 corresponding to the function node 180 (Step S501). Then, the function node control unit 110 records, as a journal log in the journal log storing unit 160, the pair of the input message input from the input port 111 and the program ID defined in the function node in a corresponding manner to the computer program 182 (Step S502). Moreover, the function node control unit 110 sends the input message and the program ID to the virtual machine unit 130 of the persistent execution unit 120 corresponding to the persistent execution environment 190 identified at Step S501 (Step S503). Subsequently, when the execution result of the computer program 182 is sent by the virtual machine unit 130, the function node control unit 110 receives the execution result from the virtual machine unit 130 and outputs it as an output message from the output port 112 (Step S504).

Figure 14:
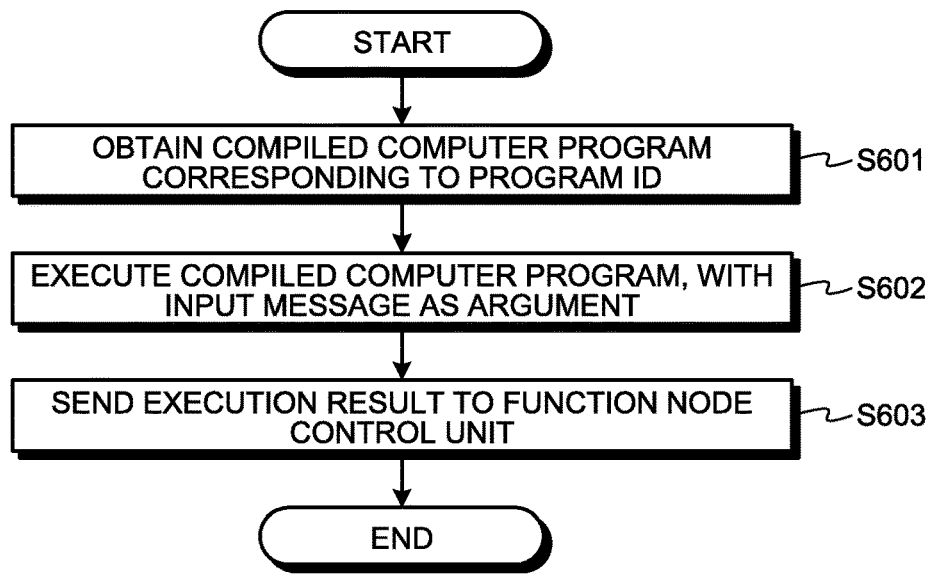
FIG. 14 is a flowchart for explaining exemplary operations performed by the virtual machine unit.

FIG. 14 is a flowchart for explaining exemplary operations performed by the virtual machine unit 130 according to the modification example. In FIG. 14 is illustrated the sequence of execution of callScript when an input message and a program ID are received from the function node control unit 110. When the input message and the program ID are received from the function node control unit 110, the virtual machine unit 130 refers to, for example, the correspondence table 138 illustrated in FIG. 12 and obtains the compiled computer program 182 corresponding to the program ID received from the function node control unit 110 (Step S601). Then, with the input message received from the function node control unit 110 serving as the argument, the virtual machine unit 130 executes the compiled computer program 182 obtained at Step S601 (Step S602), and sends the execution result to the function node control unit 110 (Step S603).

Figure 15:
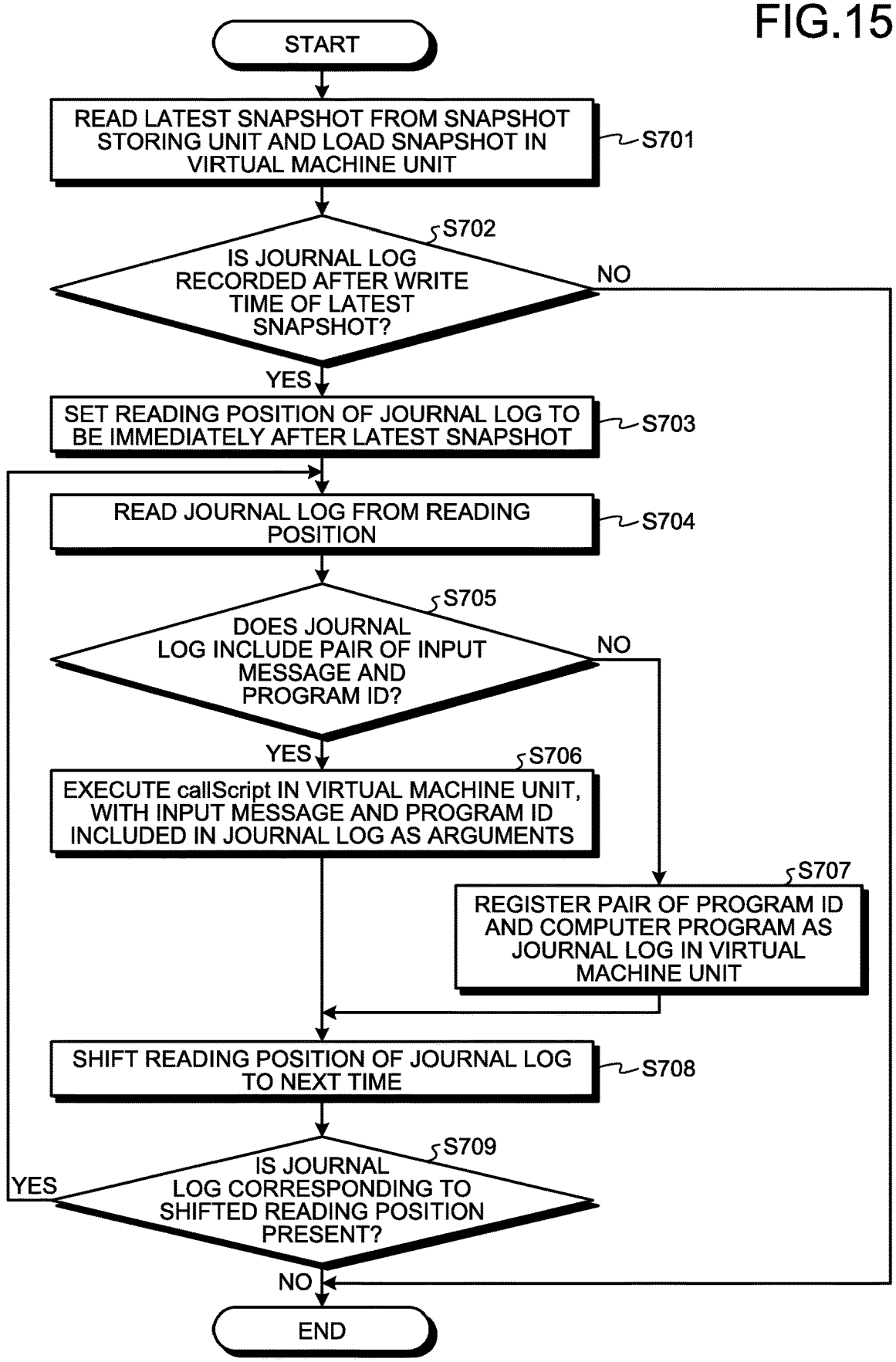
FIG. 15 is a flowchart for explaining exemplary operations performed by the recovery unit.

FIG. 15 is a flowchart for explaining exemplary operations performed by the recovery unit 140 according to the modification example. At the time of activation of the information processing device 100; firstly, the recovery unit 140 reads the latest snapshot from the snapshot storing unit 170 and loads it in the virtual machine unit 130 (Step S701). Then, the recovery unit 140 confirms whether or not a journal log is recorded after the write time of the latest snapshot (Step S702). If a journal log is recorded after the write time of the latest snapshot (Yes at Step S702), then the reading position of the journal log is set to be immediately after the latest snapshot (Step S703). On the other hand, if no journal log is recorded after the write time of the latest snapshot (No at Step S702), the operations are ended.

Subsequently, the recovery unit 140 reads, from the journal log storing unit 160, the journal log recorded at the set reading position (Step S704). Then, the recovery unit 140 confirms whether the read journal log includes the pair of the input message and the program ID (Step S705). Herein, if the read journal log includes the pair of the input message and the program ID (Yes at Step S705), then the recovery unit 140 causes the virtual machine unit 130 to execute callScript with the input message and the program ID, which constitute the journal log, as the arguments (Step S706). On the other hand, if the read journal log includes the pair of the program ID and the computer program 182 of the function node 180, then the recovery unit 140 registers the pair of the program ID and the computer program 182 in the virtual machine unit 130 (Step S707).

Subsequently, the recovery unit 140 shifts the reading position of the journal log to the recording time of the next journal log (Step S708), and confirms whether or not the journal log corresponding to the reading position is present (Step S709). If the journal log corresponding to the reading position is present (Yes at Step S709), then the system control returns to Step S704 and the subsequent operations are performed again. On the other hand, if the journal log corresponding to the reading position is not present (No at Step S709), the operations are ended.

As described above, in the modification example, when an input message of the function node 180 is input, instead of recording the actual computer program 182 of the function node 180, the program ID of the computer program 182 is recorded in pair with the input message as a journal log, and the journal log is sent to the virtual machine unit 130. Hence, it becomes possible to reduce the size of the journal log, and to achieve reduction in the data volume; as well as it becomes possible to reduce the data size to be sent to the virtual machine unit 130 and to shorten the transfer time.

Moreover, in the modification example, at the time of registering the computer program 182 of the function node 180 in the virtual machine unit 130, since the computer program is parsed in advance and kept in the complied state, when an input message of the function node 180 is input, the period for execution of the computer program 182 can be shortened.

Second Embodiment

In a second embodiment, a function is added to the first embodiment. The added function is for sending a message, which is originated in the persistent execution unit 120, inside the flow.

The persistent execution unit 120 that is disposed in a corresponding manner to the persistent execution environment 190 does not function as a mere persistent data store, and the fact that the execution environment itself is persistent implies that the execution of computer programs in that execution environment is also persistent. Hence, by proactively making use of that fact, it is also possible to have a design in which messages originated in the persistent execution unit 120 are transmitted to the outside. However, the access to other devices is expressed as processing nodes of the normal FBP, and those processing nodes are existing processing nodes not related to the persistent execution environment 190. In that regard, in the second embodiment, a processing node called an event listener node is used for enabling establishment of connection. The event listener node is a processing node for which the persistent execution environment name and the event name are user-defined.

Figure 16:
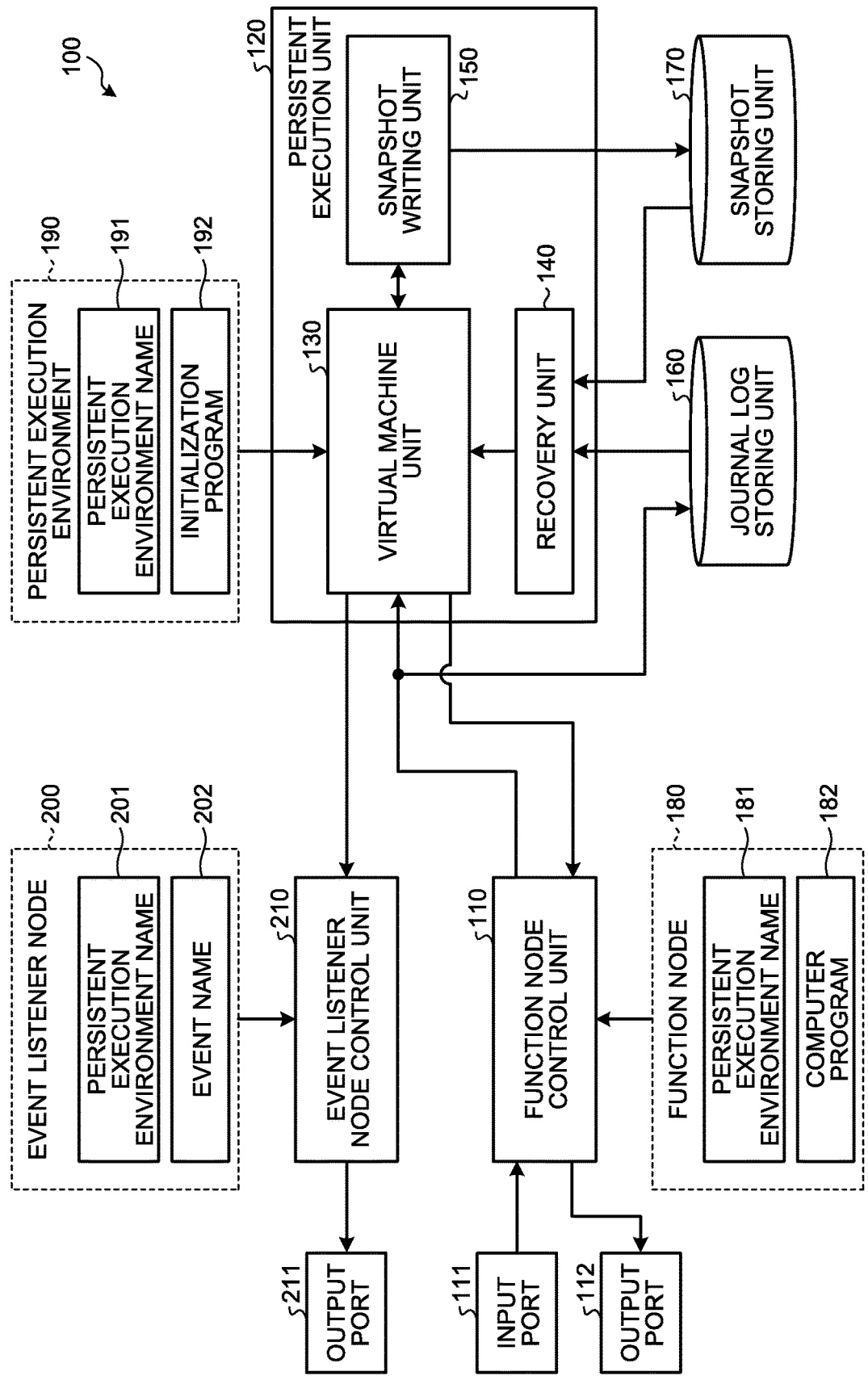
FIG. 16 is a block diagram illustrating an exemplary functional configuration of the information processing device according to a second embodiment.

FIG. 16 is a block diagram illustrating an exemplary functional configuration of the information processing device 100 according to the second embodiment. As illustrated in FIG. 16, with respect to the configuration according to the first embodiment, the information processing device 100 according to the second embodiment additionally includes an event listener node control unit 210 that is disposed in a corresponding manner to an event listener node 200 deployed in the information processing device 100 from the programming environment of the FBP. The event listener node 200 that is deployed from the programming environment of the FBP includes a persistent execution environment name 201 and an event name 202 that are user-defined. The persistent execution environment name 201 of the event listener node 200 is matched with the persistent execution environment name 191 of the persistent execution environment 190, so that the event listener node 200 and the persistent execution environment 190 get associated with each other.

The virtual machine unit 130 according to the second embodiment executes the computer program of the function node 180 in an identical manner to the first embodiment. During the execution of the computer program, when an emit function is executed, the virtual machine unit 130 sends an event name and a message representing the arguments of the emit function to the event listener node control unit 210.

The emit function is a function of JavaScript stored in a reserved variable "emit", which is registered in the global scope 135 unique to the virtual machine unit 130, as a reserved variable of the persistent execution environment 190; and uses an event name and a message as the arguments.

When an event name and a message are received from the virtual machine unit 130, the event listener node control unit 210 confirms whether or not the received event name matches with the user-defined event name of the event listener node 200. If the two event names are matching, then the event listener node control unit 210 outputs the message, which is received from the virtual machine unit 130, from an output port 211.

Figure 17:
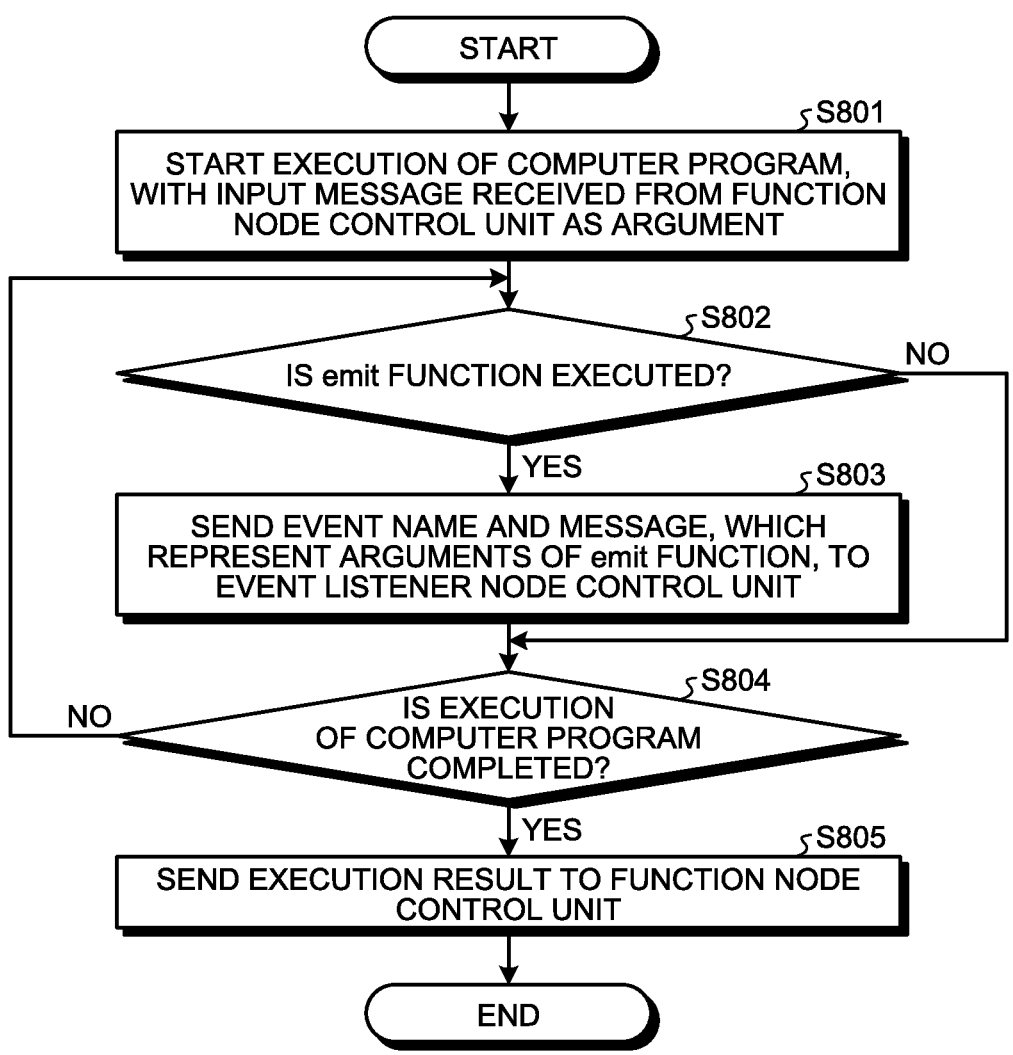
FIG. 17 is a flowchart for explaining exemplary operations performed by the virtual machine unit.

FIG. 17 is a flowchart for explaining exemplary operations performed by the virtual machine unit 130 according to the second embodiment. In FIG. 17 is illustrated the flow of the operations performed at the time of execution of the computer program 182 of the function node 180. When an input message and the computer program 182 are received from the function node control unit 110, the virtual machine unit 130 starts the execution of the computer program 182 with the received input message serving as the argument (Step S801). During the execution of the computer program 182, the virtual machine unit 130 monitors the execution of the emit function (Step S802). When the emit function is executed (Yes at Step S802), the virtual machine unit 130 sends the event name and the message, which represent the arguments of the emit function, to the event listener node control unit 210 (Step S803). When the execution of the computer program 182 is completed (Yes at Step S804), the virtual machine unit 130 sends the execution result of the computer program 182 to the function node control unit 110 (Step S805). That marks the end of the operations.

Figure 18:
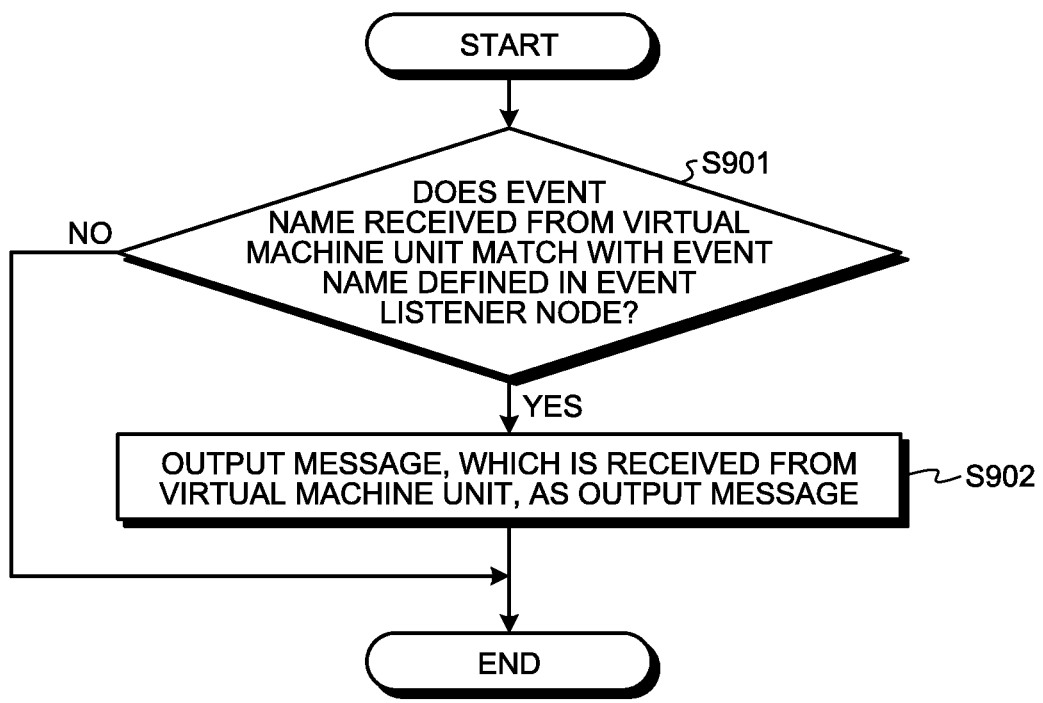
FIG. 18 is a flowchart for explaining exemplary operations performed by an event listener node control unit.

FIG. 18 is a flowchart for explaining exemplary operations performed by the event listener node control unit 210. When an event name and a message is received from the virtual machine unit 130, the event listener node control unit 210 confirms whether or not the received event name matches with the event name 202 defined in the event listener node 200 (Step S901). If the event name received from the virtual machine unit 130 matches with the event name 202 defined in the event listener node 200 (Yes at Step S901), then the event listener node control unit 210 outputs the message, which is received from the virtual machine unit 130, from the output port 211 (Step S902). On the other hand, if the event name received from the virtual machine unit 130 does not match with the event name 202 defined in the event listener node 200 (No at Step S901), then the event listener node control unit 210 destroys the message received from the virtual machine unit 130. That marks the end of the operations.

As described above, in the second embodiment, as a result of deploying the event listener node 200 in the information processing device 100 from the programming environment of the FBP and disposing the event listener node control unit 210 in the information processing device 100, when the emit function stored in a reserved variable of the persistent execution environment 190 is executed, a message serving as the argument of the emit function is output. Thus, the message originated in the persistent execution unit 120 can be transmitted to the outside.

Third Embodiment

In a third embodiment, a function is added to the first embodiment. The added function is for accessing the persistent execution unit 120 in a read-only manner.

In the first embodiment, for example, in order to simply refer to the value of a variable x of the global scope 135, a computer program "return x" that returns the value of the variable x needs to be executed. Internally, the following sequence is followed: the computer program "return x" gets recorded as a journal log in the journal log storing unit 160; the function scope 134 to be used in executing the computer program "return x" is generated; the computer program "return x" is executed; and the variable name resolving unit 136 resolves the variable x and obtains its value. However, in a read-only access, since the state of the virtual machine unit 130 is not changed, the operations need not be performed in the abovementioned sequence in the first place in preparation for restoring the state of virtual machine unit 130. In that regard, in the third embodiment, a read-only access unit is disposed as the function for accessing the persistent execution unit 120 in a read-only manner and, if the value of a variable registered in the global scope 135 is to be simply referred to, the persistent execution unit 120 can be made accessible via the read-only access unit.

Moreover, in the third embodiment, a template processing node is illustrated as a processing node for referring to the value of a variable registered in the global scope 135. The template processing node is a processing node in which a template such as an HTML document (HTML stands for HyperText Markup Language) is user-defined, and in which a variable name is specified or a formula using the variable name is specified at the embedding position. Furthermore, the template processing node used in the third embodiment has a user-defined persistent execution environment name, so that it gets associated with the persistent execution environment 190.

Figure 19:
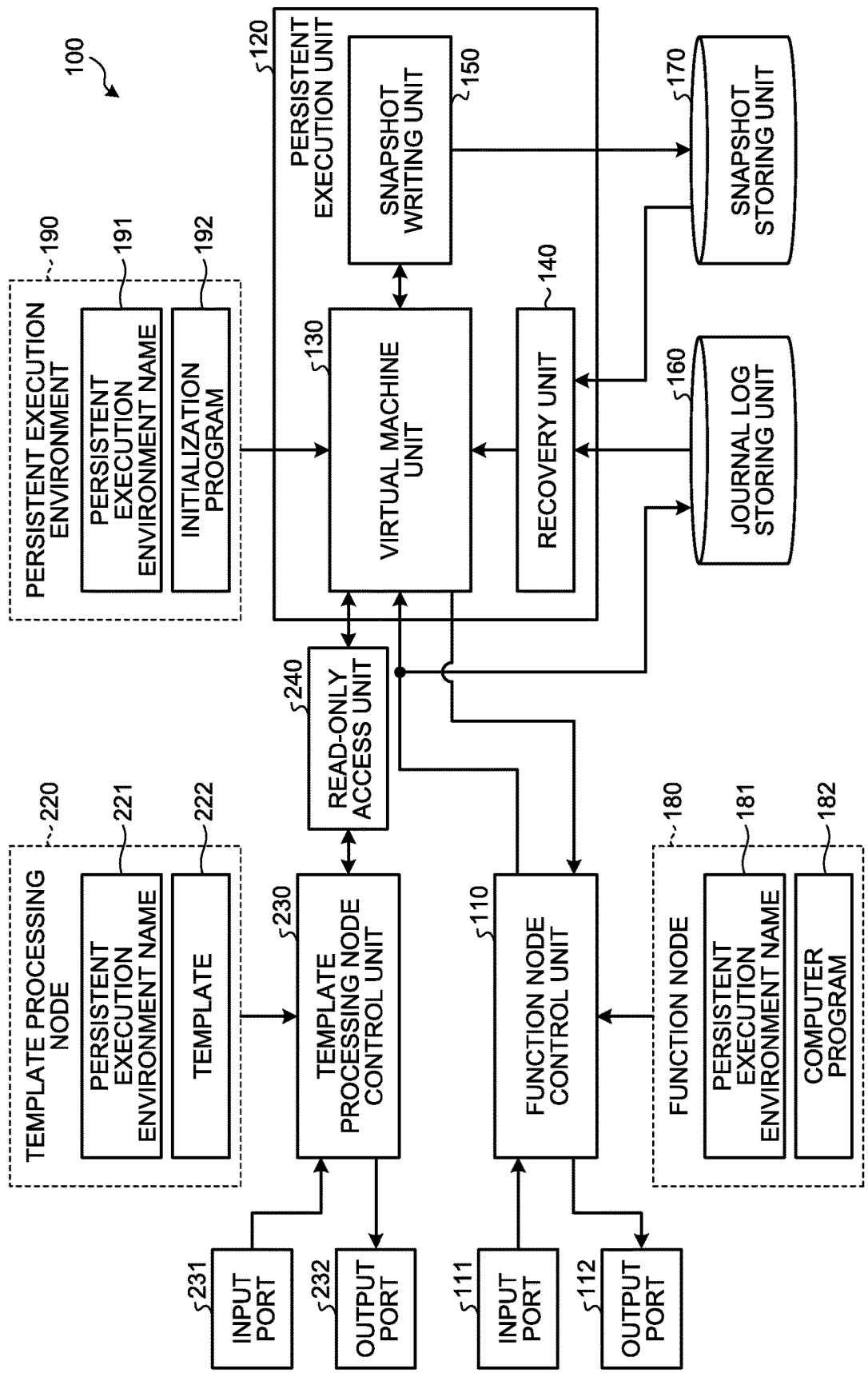
FIG. 19 is a block diagram illustrating an exemplary functional configuration of the information processing device according to a third embodiment.

FIG. 19 is a block diagram illustrating an exemplary functional configuration of the information processing device 100 according to the third embodiment. As illustrated in FIG. 19, with respect to the configuration according to the first embodiment, the information processing device 100 according to the third embodiment additionally includes a template processing node control unit 230, which is disposed in a corresponding manner to a template processing node 220 deployed in the information processing device 100 from the programming environment of the FBP, and a read-only access unit 240. The template processing node 220 that is deployed from the programming environment of the FBP includes a persistent execution environment name 221 and a template 222 that are user-defined. The persistent execution environment name 221 of the template processing node 220 is matched with the persistent execution environment name 191 of the persistent execution environment 190, so that the template processing node 220 and the persistent execution environment 190 get associated with each other.

The read-only access unit 240 is a function for accessing the persistent execution unit 120 in a read-only manner as described earlier, and obtains the values of variables registered in the global scope 135 of the virtual machine unit 130. At the time of obtaining a value, the read-only access unit 240 does not vary the state of the virtual machine unit 130.

When an input message of the template processing node 220 is input to an input port 231; the template processing node control unit 230 reads, from the global scope 135 of the virtual machine unit 130 via the read-only access unit 240, the value of the variable name specified at the embedding position of the user-defined template 222 in the template processing node 220 as the variable name of the variable registered in the global scope 135 of the virtual machine unit 130. Then, the template processing node control unit 230 embeds, at the embedding position of the template 222, the value read from the global scope 135 of the virtual machine unit 130 via the read-only access unit 240; and outputs the template 222, which has the value embedded therein, as an output message from an output port 232. In the case of a formula in which the variable name is used, the variable name is replaced with the value via the read-only access unit 240 in an identical manner; the formula is calculated; and the result is embedded in the template 222. The calculation of the formula is performed on the outside of the virtual machine unit 130 of the persistent execution unit 120, that is, performed in a different instance than the virtual machine unit 130.

As described above, in the third embodiment, the read-only access unit 240 is disposed for accessing the persistent execution unit 120 in a read-only manner and, when the template processing node control unit 230 refers to the value of a variable registered in the global scope 135 of the virtual machine unit 130, the value is obtained via the read-only access unit 240. Hence, a journal log need not be recorded every time the persistent execution unit 120 is accessed, thereby resulting in enhancement in the execution performance and shortening of the recovery time required to restore the state of the virtual machine unit 130 at the time of activation of the information processing device 100.

Fourth Embodiment

A fourth embodiment is same as the third embodiment in including the read-only access unit 240 for accessing the persistent execution unit 120 in a read-only manner, but has a different processing node than the third embodiment for referring to the values of the variables registered in the global scope 135. That is, in the fourth embodiment, a read-only function node is illustrated as the processing node for referring to the values of the variables registered in the global scope 135.

The read-only function node is identical to the function node 180 in enabling user-defining a computer program, but is a processing node that executes the computer program in an individual instance and uses the persistent execution environment for reading from undefined variables in the computer program.

Figure 20:
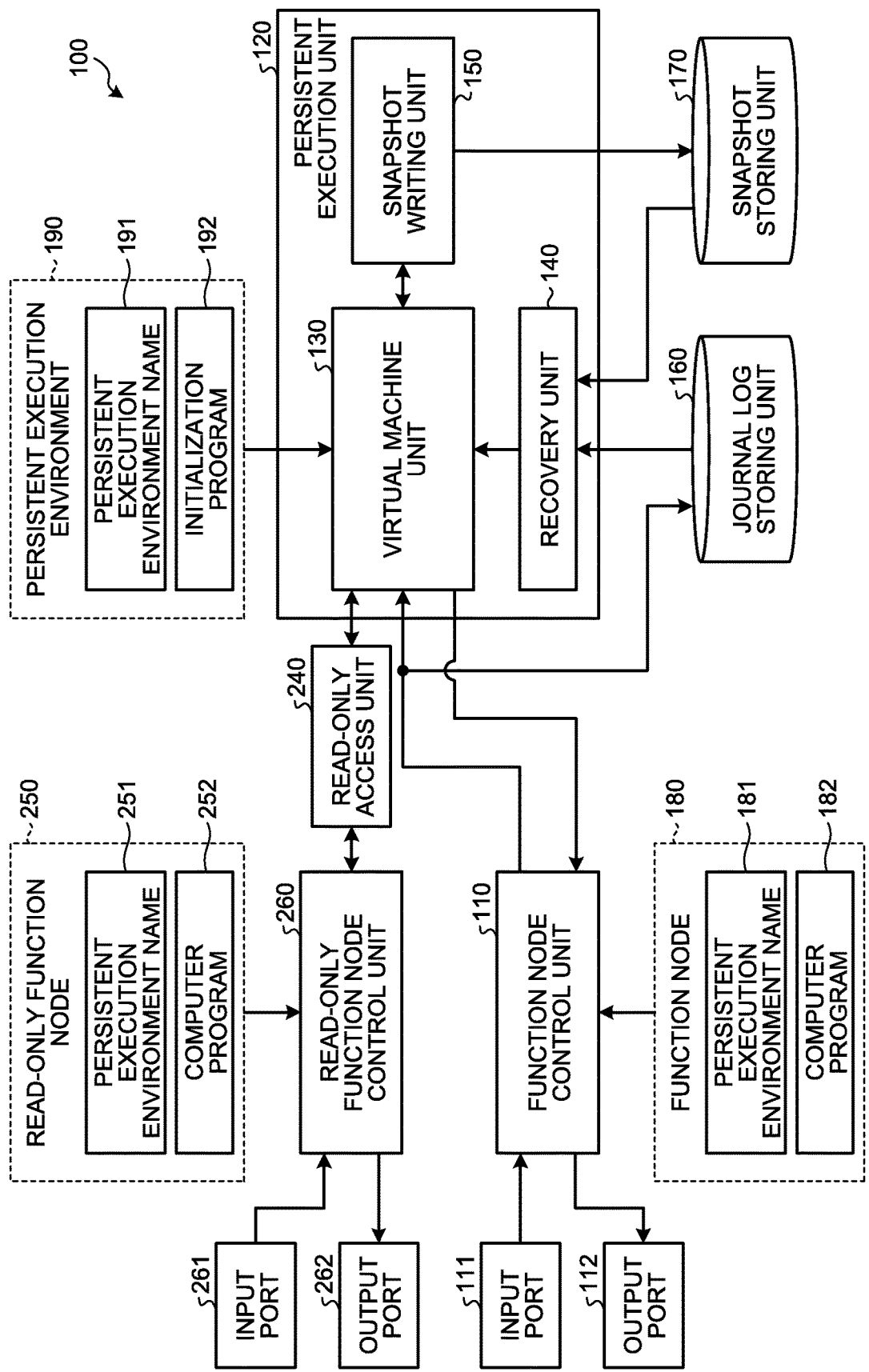
FIG. 20 is a block diagram illustrating an exemplary functional configuration of the information processing device according to a fourth embodiment.

FIG. 20 is a block diagram illustrating an exemplary functional configuration of the information processing device 100 according to the fourth embodiment. As illustrated in FIG. 20, in the information processing device 100 according to the fourth embodiment, the template processing node control unit 230 according to the third embodiment is substituted with a read-only function node control unit 260 that is disposed in a corresponding manner to a read-only function node 250 deployed in the information processing device 100 from the programming environment of the FBP. The read-only function node 250 that is deployed from the programming environment of the FBP includes a persistent execution environment name 251 and a computer program 252. The persistent execution environment name 251 of the read-only function node 250 is matched with the persistent execution environment name 191 of the persistent execution environment 190, so that the read-only function node 250 and the persistent execution environment 190 get associated with each other.

When an input message of the read-only function node 250 is input to an input port 261; the read-only function node control unit 260 uses the input message as the argument and executes the computer program 252 that is user-defined in the read-only function node 250, and outputs the execution result as an output message from an output port 262. The execution of the computer program 252 by the read-only function node control unit 260 is performed in a separate and specific instance different than the virtual machine unit 130 of the persistent execution unit 120, and there is no impact on the state of the virtual machine unit 130.

At the time of executing the computer program 252, regarding the reading from an undefined variable in the computer program 252, the read-only function node control unit 260 reads the value of that variable from the global scope 135 of the virtual machine unit 130 via the read-only access unit 240. Meanwhile, if writing is performed with respect to an undefined variable in the computer program 252, then the read-only function node control unit 260 firstly reads that value from the global scope 135 of the virtual machine unit 130 via the read-only access unit 240. Then, the read-only function node control unit 260 compares the read value with the value to be written and, if the values are different, issues an exception indicating a reference error. On the other hand, if the value read from the global scope 135 of the virtual machine unit 130 matches with the value to be written, then the read-only function node control unit 260 does not actually perform writing and behaves as if the writing was successful.

Meanwhile, if the read-only function node 250 is allowed to be seamlessly switched with the above-explained function node 180, then there is enhancement in the user-friendliness of the programming environment. More particularly, a method is thinkable in which, in a user interface (UI) displayed in the programming environment, the function node 180 and the read-only function node 250 are displayed as combined processing nodes, and the read-only attribute can be switched using a checkbox.

As described above, in the fourth embodiment, at the time of referring to the value of a variable registered in the global scope 135 of the virtual machine unit 130, the read-only function node control unit 260 obtains the value via the read-only access unit 240. Hence, in an identical manner to the third embodiment, a journal log need not be recorded every time the persistent execution unit 120 is accessed, thereby resulting in enhancement in the execution performance and shortening of the recovery time required to restore the state of the virtual machine unit 130 at the time of activation of the information processing device 100.

Fifth Embodiment

In a fifth embodiment, using the functions of the information processing device 100 according to the embodiments described above, the state of the virtual machine unit 130 at an arbitrary time in the past is made reproducible. That is, when the information processing device 100 is activated after having been switched off, using the snapshots recorded in the snapshot storing unit 170 and the journal logs stored in the journal log storing unit 160, the virtual machine unit 130 of the persistent execution unit 120 is roll-forwarded to the latest state. In an identical sequence of operations, the state of the virtual machine unit 130 at an arbitrary time in the past can be reproduced using the snapshots and the journal logs.

Meanwhile, the device that reproduces a state of the virtual machine unit 130 (hereinafter, called a "reproduction device") is a different device than the information processing device 100 that includes the virtual machine unit 130. For example, the reproduction device is connected to the information processing device 100 via a network.

Alternatively, the configuration can be such that the reproduction device is directly connected to the information processing device 100. Moreover, the configuration can be such that the snapshot recorded in the snapshot storing unit 170 and the journal log recorded in the journal log storing unit 160 of the information processing device 100 are stored in a memory medium, and that memory medium is connected to the reproduction device. In the embodiments described above, since an IoT device called a gateway is assumedly used as the information processing device 100, the reproduction device is configured to be a separate device from the information processing device 100. However, if the information processing device 100 is configured to include a console representing the user interface, then the reproduction device can be implemented as an internal function of the information processing device 100. When a past state of the information processing device 100 is to be analyzed in detail using trouble analysis, the reproduction device serves as a powerful tool and is thus a practically useful function.

Figure 21:
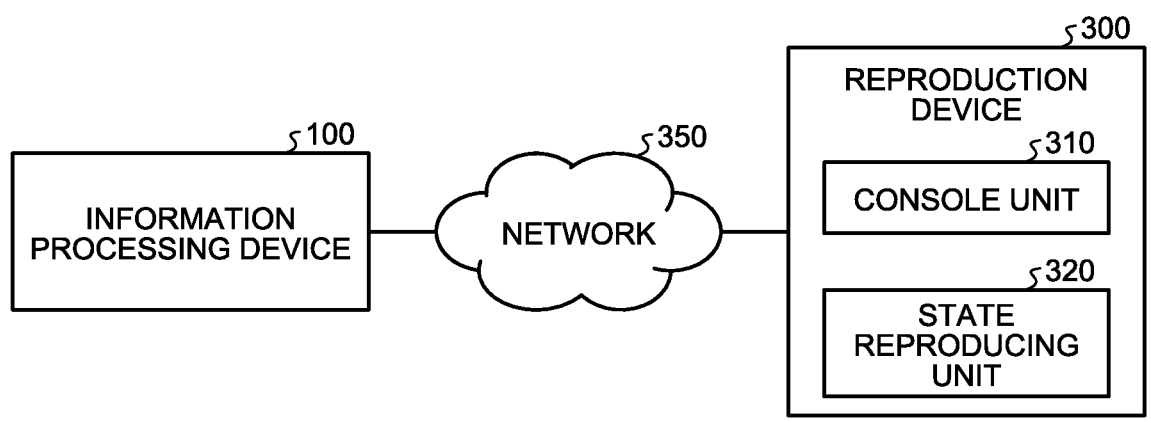
FIG. 21 is a block diagram illustrating an outline configuration of an information processing system according to a fifth embodiment.

In the fifth embodiment, the explanation is given with reference to an example of an information processing system in which the information processing device 100 and the reproduction device are connected via a network. FIG. 21 is a block diagram illustrating an outline configuration of the information processing system according to the fifth embodiment. As illustrated in FIG. 21, the information processing device 100 according to any one embodiment described above and a reproduction device 300 are connected via a network 350. For example, the reproduction device 300 includes hardware resources of a general-purpose computer in an identical manner to the information processing device 100, and includes a console representing the user interface as a peripheral device of the computer. As illustrated in FIG. 21, the reproduction device 300 includes a console unit 310 and a state reproducing unit 320 as functional constituent elements implemented using computer programs (software) executed in the computer and a console.

The console unit 310 receives a user operation of specifying an arbitrary time in the past (i.e., the target time for reproduction of the state of the virtual machine unit 130 of the information processing device 100). The state reproducing unit 320 implements the same method as implemented by the recovery unit 140 of the information processing device 100, and reproduces the state of the virtual machine unit 130 of the information processing device 100 at the time specified by the user operation. That is, the state reproducing unit 320 obtains, from the information processing device 100, the snapshot recorded at a particular time earlier than the time specified by the user operation; loads the snapshot in the internal memory of the reproduction device 300; and reproduces, in the internal memory, the state of the virtual machine unit 130 at that particular time. Then, the state reproducing unit 320 obtains, from the information processing device 100, the journal logs recorded from that particular time to the time specified by the user operation; sequentially executes, in the internal memory, the computer program with the input message constituting each journal log serving as the argument; and reproduces the state of the virtual machine unit 130 at the time specified by the user operation.

The target time for reproduction of the state of the virtual machine unit 130 can be identified according to, for example, a tag attached to the journal log. As a standard practice, as a tag indicating the data and time of recording, a time stamp is attached to the journal log. Alternatively, if the journal log to be recorded satisfies a predetermined condition, a character string representing that condition can be attached as a tag. Still alternatively, a sequential pattern that repeatedly appears in the journal logs recorded in the journal log storing unit 160 can be recognized and, when there is a change in the pattern, a tag can be automatically attached.

The console unit 310 can be configured, for example, to display a list of tagged journal logs, and to receive a user operation of selecting the desired journal log. In that case, generally, since a large volume of journal logs is recorded in the journal log storing unit 160, it is desirable to display the journal logs by restricting the display range in chronological order or by providing a function to search for or narrow down on the character string of a particular tag.

Meanwhile, tags need not be attached to the journal logs, and can be recorded as separate entries from the normal journal logs in the journal log storing unit 160. In that case, the console unit 310 can display a list of tag entries, and can receive a user operation of selecting the desired tag entry. In such a configuration, the state in which the journal log that is recorded immediately before the selected tag entry in the user operation is reflected in the virtual machine unit 130 represents the state of the virtual machine unit 130 to be reproduced.

Figure 22:
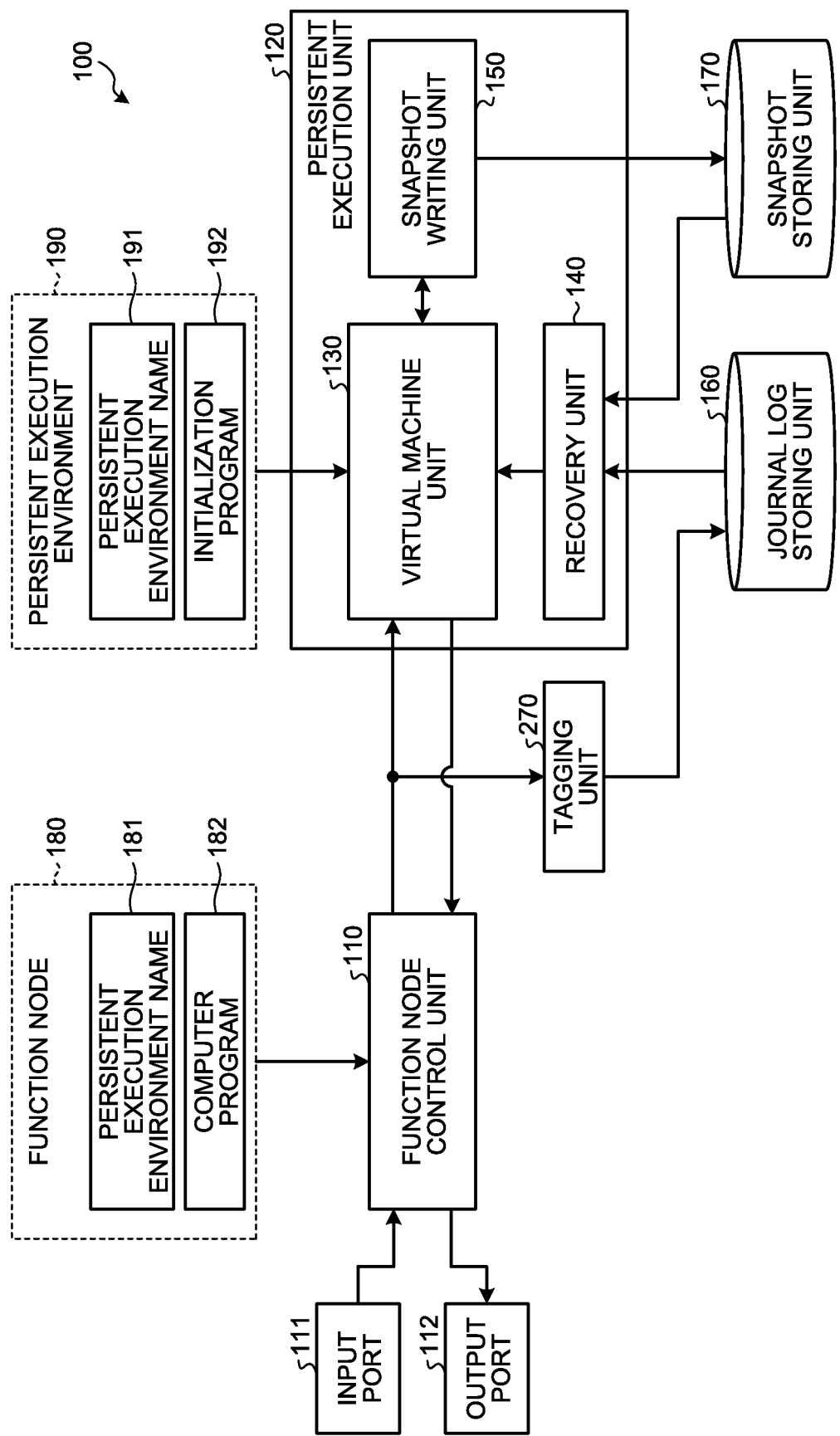
FIG. 22 is a block diagram illustrating an exemplary functional configuration of the information processing device according to the fifth embodiment.

FIG. 22 is a block diagram illustrating an exemplary functional configuration of the information processing device 100 according to the fifth embodiment. As illustrated in FIG. 22, with respect to the configuration according to the first embodiment, the information processing device 100 according to the fifth embodiment additionally includes a tagging unit 270. In the first embodiment, in order to restore the virtual machine unit 130 to the latest state, the recovery unit 140 uses the latest snapshot and the journal logs recorded after the latest snapshot. Hence, every time the latest snapshot gets recorded, the older snapshots and the older journal logs can be deleted. In contrast, in the fifth embodiment, since the state of the virtual machine unit 130 at an arbitrary time in the past is reproduced, it is desirable to keep the older snapshots and the older journal logs as much as possible depending on the storage capacity of the snapshot storing unit 170 and the journal log storing unit 160.

At the time of recording a journal log, the tagging unit 270 attaches the date and time or an arbitrary character string as a tag to the journal log. As described earlier, the configuration can be such that, if the journal log satisfies a predetermined condition, the tagging unit 270 attaches a character string representing that condition, or recognizes a sequential pattern that repeatedly appears in the journal logs recorded in the journal log storing unit 160 and, when there is a change in the pattern, automatically attaches a tag in the form of a character string indicating the details of the change. In such a configuration, as described above, the tagging unit 270 can record the tag entries as separate entries from the normal journal logs in the journal log storing unit 160.

Since the information processing device 100 includes the tagging unit 270, the console unit 310 of the reproduction device 300 can display a list of tagged journal logs or a list of tag entries, and can receive an operation of selecting the desired journal log or the desired tag entry as a user operation of specifying the target time for reproduction of the state of the virtual machine unit 130.

Figure 23:
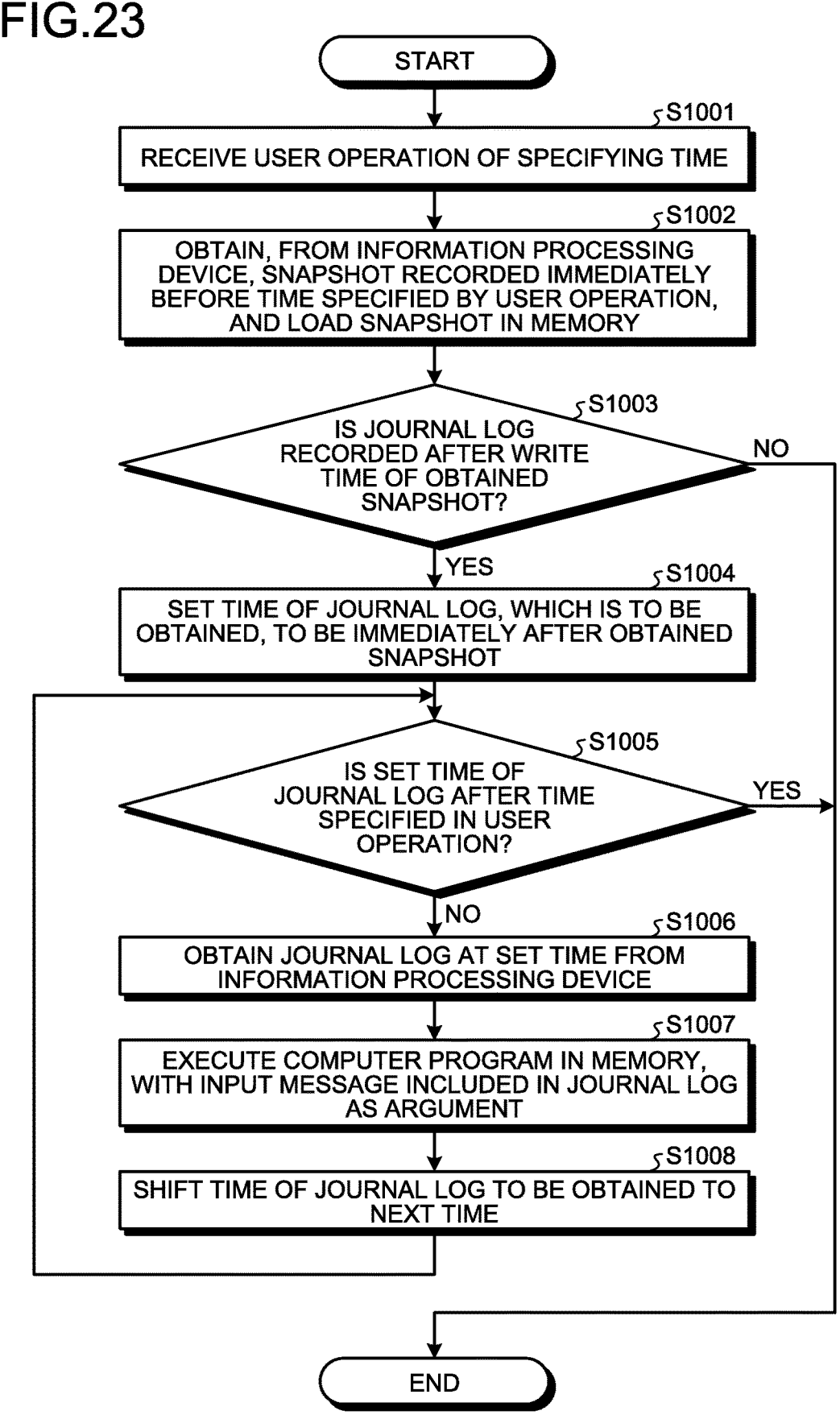
FIG. 23 is a flowchart for explaining exemplary operations performed in a reproduction device.

FIG. 23 is a flowchart for explaining exemplary operations performed in the reproduction device 300. Firstly, the console unit 310 receives a user operation of specifying the target time for reproduction of the state of the virtual machine unit 130 (Step S1001). Then, the state reproducing unit 320 obtains, from the information processing device 100, the snapshot recorded immediately before the time specified by the user operation, and loads that snapshot in the memory (Step S1002).

Subsequently, the state reproducing unit 320 confirms whether or not a journal log is recorded after the write time of the obtained snapshot (Step S1003). If a journal log is recorded after the write time of the obtained snapshot (Yes at Step S1003), then the state reproducing unit 320 sets the reading position of the journal log, which is obtained from the information processing device 100, to be immediately after the obtained snapshot (Step S1004). On the other hand, if no journal log is recorded after the write time of the obtained snapshot (No at Step S1003), the operations are ended.

Then, the state reproducing unit 320 confirms whether or not the time of the set journal log is after the time specified by the user operation (Step S1005). If the time of the set journal log is same as or before the time specified by the user operation (No at Step S1005), then the state reproducing unit 320 obtains the journal log at the set time from the information processing device 100 (Step S1006); and executes the computer program 182, which constitutes the obtained journal log, on the memory with the input message included in the journal log serving as the argument (Step S1007). The state reproducing unit 320 shifts the time of the journal log to be obtained to the recording time of the next journal log (Step S1008). Then, the system control returns to Step S1005 and the subsequent operations are performed again. Subsequently, when the time of the journal log to be obtained from the information processing device 100 arrives after the specified time (Yes at Step S1005), the operations are ended.

Meanwhile, in the explanation given above, the reproduction device 300 sequentially obtains the journal logs in the time order from the information processing device 100. Alternatively, at the time of obtaining a snapshot from the information processing device 100, the reproduction device 300 can collectively obtain all journal logs recorded from the write time of the snapshot to the time specified by the user operation, and can sequentially reflect the obtained journal logs in the memory.

The reproduced state of the virtual machine unit 130 of the information processing device 100 at an arbitrary time as reproduced by the state reproducing unit 320 of the reproduction device 300 can be presented to the user when, for example, the console unit 310 displays that state in some form. In that case, the user can interactively refer to the details of the variables and can execute arbitrary computer programs via the console unit 310.

Moreover, in the reproduction device 300, in response to a user operation performed using the console unit 310, it is possible to modify the reproduced state of the virtual machine unit 130 of the information processing device 100 at an arbitrary time as reproduced by the state reproducing unit 320. Furthermore, ab arbitrary number of journal logs recorded after the time of reproduction can be obtained from the information processing device 100 and can be sequentially executed on the memory, so that the modified past state of the virtual machine unit 130 can be roll-forwarded. Then, for example, in response to a user operation performed using the console unit 310, the roll-forwarded state of the virtual machine unit 130 can be sent from the reproduction device 300 to the information processing device 100, and the state of the virtual machine unit 130 of the information processing device 100 can be substituted with the state sent by the reproduction device 300.

With this function, it becomes possible to modify a past state of the virtual machine unit 130 of the information processing device 100, and to modify the latest state of the virtual machine unit 130 by reflecting earlier modifications. That is, the journal logs recorded in the information processing device 100 do not represent the modification history of the virtual machine unit 130 but represent the computer programs executed in the virtual machine unit 130 and their arguments. Hence, if a past state of the virtual machine unit 130 is modified and then roll-forwarding to the latest state is performed, then a different latest state having the modification reflected therein comes into existence. If that state is applied in the actual virtual machine unit 130, then it becomes possible to modify the latest state of the virtual machine unit 130. For example, the state of the virtual machine unit 130 at a past time at which some failure had occurred can be reproduced using the reproduction device 300; correction of the faulty portion can be performed; and roll-forwarding can be performed up to the latest state, so that the current state can be generated that is not impacted by the failure.

As described above, in the fifth embodiment, the state of the virtual machine unit 130 at an arbitrary time in the past can be reproduced using the reproduction device 300. Then, the reproduced state of the virtual machine unit 130 in the past is modified, and is then applied in the virtual machine unit 130 after roll-forwarding. As a result, the latest state of the virtual machine unit 130 can be modified to a state in which the correction of the past failure, which had caused trouble, is reflected.

Modification Example

In the information processing device 100 according to the fifth embodiment, the function for tagging the journal logs is implemented as an independent function from the flow created in the programming environment of the FBP. Alternatively, for example, tagging can be performed from the inside of the flow using a tagging processing node that is for attaching a tag of the time at which a predetermined operation starts/gets completed (i.e., for recording a tag entry in the journal log storing unit 160).

Figure 24:
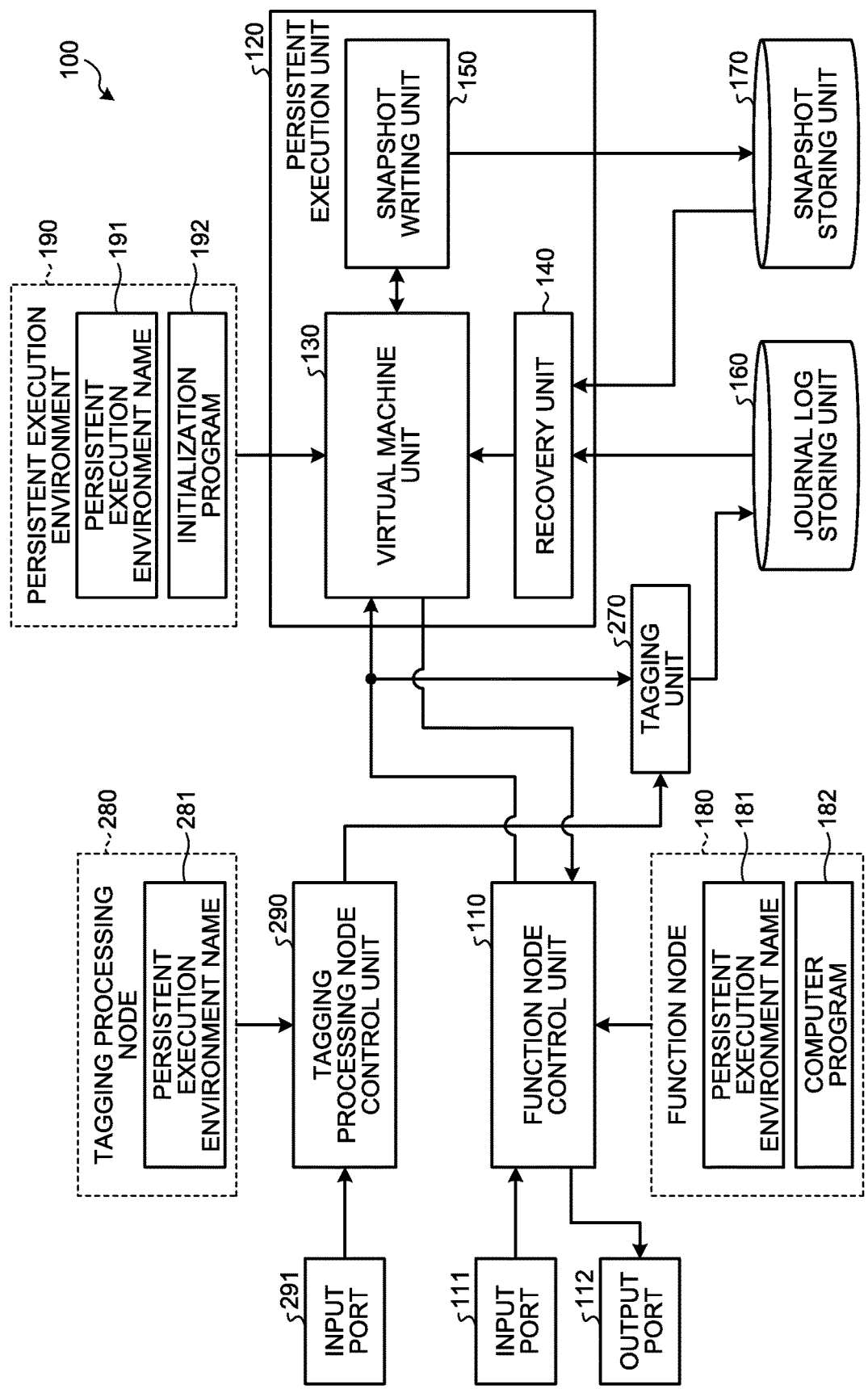
FIG. 24 is a block diagram illustrating an exemplary functional configuration of the information processing device according to a modification example.

FIG. 24 is a block diagram illustrating an exemplary functional configuration of the information processing device 100 according to a modification example. As illustrated in FIG. 24, with respect to the configuration according to the fifth embodiment, the information processing device 100 according to the modification example additionally includes a tagging processing node control unit 290 that is disposed in a corresponding manner to a tagging processing node 280 deployed in the information processing device 100 from the programming environment of the FBP. The tagging processing node 280 that is deployed from the programming environment of the FBP includes a persistent execution environment name 281. The persistent execution environment name 281 is matched with the persistent execution environment name 191 of the persistent execution environment 190, so that the tagging processing node 280 and the persistent execution environment 190 get associated with each other.

When an input message of the tagging processing node 280 is input to an input port 291, the tagging processing node control unit 290 sends the character string included in the input message to the tagging unit 270. Upon receiving the character string from the tagging processing node control unit 290, the tagging unit 270 attaches the character string as a tag to the journal logs recorded by the function node control unit 110. Alternatively, the tagging unit 270 can record the character string, which is received from the tagging processing node control unit 290, as a tag entry in the journal log storing unit 160.

Sixth Embodiment

In the embodiments described above, the function node and the corresponding persistent execution environment are deployed from the programming environment of the FBP in the same information processing device 100. Alternatively, the configuration can be as follows: the function node and the persistent execution environment are deployed in separate information processing devices; the function node control unit 110 is disposed in one of the information processing devices; and the persistent execution unit 120 is disposed in the other information processing device. That is, the configuration can be such that, in another information processing device different than the information processing device in which the input message of the function node is input, the computer program of the function node is executed in a persistent manner.

Figure 25:
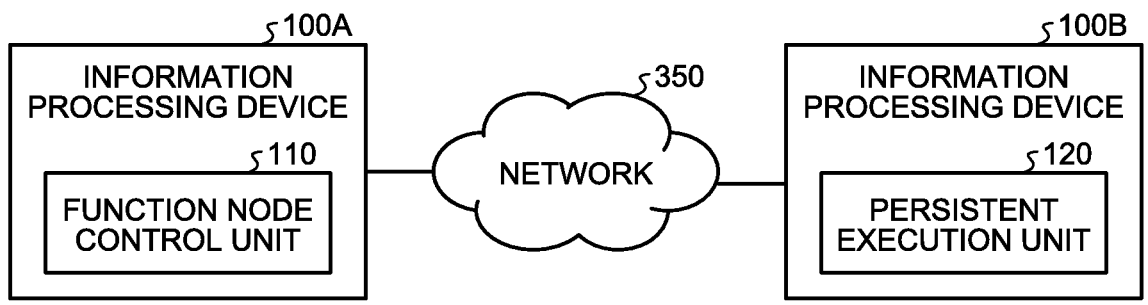
FIG. 25 is a block diagram illustrating an outline configuration of an information processing system according to a sixth embodiment.

FIG. 25 is a block diagram illustrating an outline configuration of an information processing system according to a sixth embodiment. As illustrated in FIG. 25, in the information processing system according to the sixth embodiment, an information processing device 100A including the function node control unit 110 and an information processing device 100B including the persistent execution unit 120 are connected via the network 350. For example, the information processing device 100A is an IoT device such as a gateway, and the information processing device 100B is a remote server device. Moreover, the journal log storing unit 160 and the snapshot storing unit 170 are provided in the information processing device 100B.

In the sixth embodiment also, the operations performed by the function node control unit 110 and the persistent execution unit 120 are fundamentally identical to the embodiments described earlier. However, the input messages and the computer programs that are sent by the function node control unit 110 to the persistent execution unit 120 are sent by the information processing device 100A to the information processing device 100B via the network 350 using a communication protocol such as the TCP/IP or the HTTP. Moreover, the execution result of the computer programs is sent by the information processing device 100A to the information processing device 100B via the network 350 using the same communication protocol.

Furthermore, in the sixth embodiment, the persistent execution environment name that associates the function node with the persistent execution environment is a name indicating the information processing device 100 in which the persistent execution environment is deployed, such as a name specifying the information processing device 100B in the URL format. Moreover, apart from managing the association between the function node and the persistent execution environment, the connection status between the information processing device 100A and the information processing device 100B is managed and, if the connection from the information processing device 100A to the information processing device 100B becomes disabled, the execution of the computer program of the function node gets abnormally terminated due to a connection error.

Moreover, in the sixth embodiment, the recovery unit 140 of the persistent execution unit 120 performs operations at the time of activation of the information processing device 100B (for example, a remote server device) that includes the persistent execution unit 120, and not at the time of activation of the information processing device 100A (for example, an IoT device) that includes the function node control unit 110.

In this way, in the sixth embodiment, the function node control unit 110 and the persistent execution unit 120 are disposed in separate information processing devices. In the information processing device 100B that is different than the information processing device 100A in which an input message of the function node is input, the computer program of the function node is executed in a persistent manner. That enables achieving reduction in the processing load of the information processing device 100A.

Moreover, in the configuration according to the sixth embodiment, a plurality of information processing devices 100 (for example, IoT devices) including the function node control unit 110 can be connected to the same information processing device 100B (for example, a remote server device) that includes the persistent execution unit 120. As a result, the function node control unit 110 disposed in each information processing device 100A can share the same persistent execution unit 120.

Seventh Embodiment

In a seventh embodiment, improvement is made in the information processing system according to the sixth embodiment. In the sixth embodiment, when the connection from the information processing device 100A to the information processing device 100B gets terminated, the execution of the computer program of the function node ends up in an error. In that regard, in the seventh embodiment, the issue is resolved by disposing the persistent execution unit 120 not only in the information processing device 100B but also in the information processing device 100A, and by executing the computer program of the function node not only in the persistent execution unit 120 of the information processing device 100B but also in the persistent execution unit 120 of the information processing device 100A.

Figure 26:
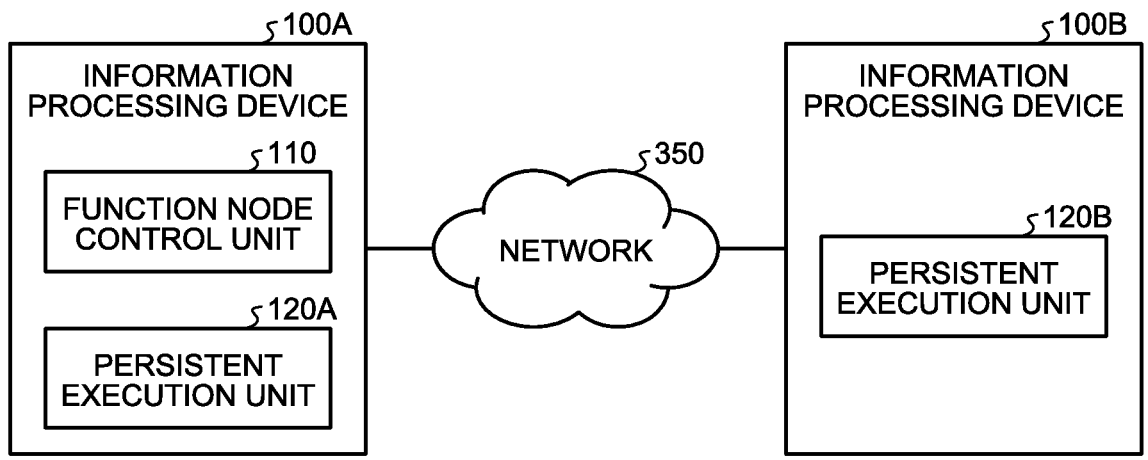
FIG. 26 is a block diagram illustrating an outline configuration of the information processing system according to a seventh embodiment.

FIG. 26 is a block diagram illustrating an outline configuration of the information processing system according to the seventh embodiment. In the seventh embodiment, as illustrated in FIG. 26, the function node control unit 110 and a persistent execution unit 120A are disposed in the information processing device 100A, and a persistent execution unit 120B is disposed in the information processing device 100B. The persistent execution units 120A and 120B are provided as a result of deploying the same persistent execution environment from the programming environment of the FBP in the information processing device 100A as well as the information processing device 100B. Moreover, in the seventh embodiment, the journal log storing unit 160 and the snapshot storing unit 170 are disposed in the information processing device 100A as well as the information processing device 100B.

In the seventh embodiment, when it is possible to establish connection from the information processing device 100A to the information processing device 100B (i.e., in the normal state), an input message and the computer program of the function node are recorded as a journal log in the journal log storing unit 160 that is disposed in the information processing device 100A as well as the information processing device 100B; and then the input message is sent by the function node control unit 110 to the persistent execution units 120A to 120B. Then, the persistent execution units 120A and 120B execute the computer program of the function node in the virtual machine unit 130 with the input message received from the function node control unit 110 serving as the argument, and send the execution result to the function node control unit 110.

At that time, the matched sequence of execution of the computer program of the function node is necessary between the persistent execution units 120A and 120B. For example, when input messages A and B are input in function nodes at almost the same timing, whether to firstly execute the computer program having the input message A as the argument or whether to firstly execute the computer program having the input message B as the argument (that decision matches with the order of recording in the journal log storing unit 160) needs to be identical in both the persistent execution units 120A and 120B.

For example, in the persistent execution unit 120A, if the computer program having the input message A as the argument is executed first and then the computer program having the input message B as the argument is executed, and, in the persistent execution unit 120B, if the computer program having the input message B as the argument is executed first and then the computer program having the input message A as the argument is executed; then there arises a possibility of getting different execution results, which needs to avoided. As a method for matching the order of execution of the computer programs, for example, the function node control unit 110 can assign order numbers on account of being the source of the messages. Alternatively, the configuration can be such that each pair of an input message and a computer program is firstly recorded in the journal log storing unit 160 of the information processing device 100A for finalizing the order, and then the pairs are sent to the persistent execution unit 120B of the information processing device 100B.

In the seventh embodiment, in the normal state, the function node control unit 110 receives the execution result from the persistent execution unit 120A as well as from the persistent execution unit 120B. Then, the function node control unit 110 can output, as the output message, the execution result received first, and can destroy the execution result received later. As a result, for example, even if the connection from the information processing device 100A to the information processing device 100B gets terminated during the execution of the computer program, it becomes possible to obtain a valid result. Moreover, if the information processing device 100B is a server device, then it is faster to execute heavy processing in the information processing device 100B. For that reason, the execution result of the computer program as obtained by the persistent execution unit 120B of the information processing device 100B is used, and thus enhancement in the processing speed is achieved.

Moreover, in the seventh embodiment, if the connection from the information processing device 100A to the information processing device 100B gets terminated, then the input messages and the computer programs of the function nodes are recorded as journal logs in the journal log storing unit 160 in the information processing device 100A, and are sent to the persistent execution unit 120A from the function node control unit 110. Then, the persistent execution unit 120A executes, using the virtual machine unit 130, the computer program of each function node with the corresponding input message received from the function node control unit 110 serving as the argument; and sends the execution result to the function node control unit 110. Subsequently, the function node control unit 110 outputs, as an output message, the execution result of the computer program as received from the persistent execution unit 120A.

Moreover, in the seventh embodiment, when the connection from the information processing device 100A to the information processing device 100B is reestablished, from among the journal logs recorded in the journal log storing unit 160 of the information processing device 100A, the journal logs that are not yet sent to the information processing device 100B are sequentially fetched, and are sent by the information processing device 100A to the information processing device 100B. In the information processing device 100B, the journal logs that are sent by the information processing device 100A are sequentially recorded in the journal log storing unit 160, and the computer program having the input message constituting each journal log serving as the argument is sequentially executed in the virtual machine unit 130 of the persistent execution unit 120B. As a result, the state of the virtual machine unit 130 of the persistent execution unit 120B is synchronized to the state of the virtual machine unit 130 of the persistent execution unit 120A. After the synchronization is complete, the normal state is restored.

Meanwhile, in the seventh embodiment, the explanation is given about an example in which the execution of the computer program of the function node is duplicated. Alternatively, as explained in the sixth embodiment, when a plurality of information processing devices 100A is connected to the same information processing device 100B and when the function node control unit 110 of each information processing device 100A shares the persistent execution unit 120B of the information processing device 100B, it is possible to have a configuration for replicated execution such as triplicated execution. In that case, since there is a plurality of function node control units 110 representing the sources for the input message and the computer program of the function node, the order of execution of the computer programs among the function node control units 110 needs to be decided with consistency. In order to achieve that, what is called the technology of distributed algorithm can be used. More particularly, for example, the order of execution of the computer programs can be decided according to the technology disclosed in Japanese Patent No. 6100384. Once the order of execution of the computer programs is decided, in an identical manner to the case of duplicated execution, the same operations can be performed in the persistent execution units 120A and 120B. Moreover, a copy of the journal logs at the time of reestablishment of connection can be stored in the journal log storing unit 160 of one of the information processing devices 100A.

Supplementary Explanation

The functions of the information processing devices 100 according to the embodiments described above can be implemented, for example, according to the cooperation between hardware constituting a general-purpose computer and computer programs (software) executed in the computer. For example, by deploying the function node 180 and the persistent execution environment 190 in a computer that would serve as the FBP execution environment and by executing computer programs for making the computer run as the FBP execution environment, the functional constituent elements such as the function node control unit 110 and the persistent execution unit 120 are implemented in the computer.

Figure 27:
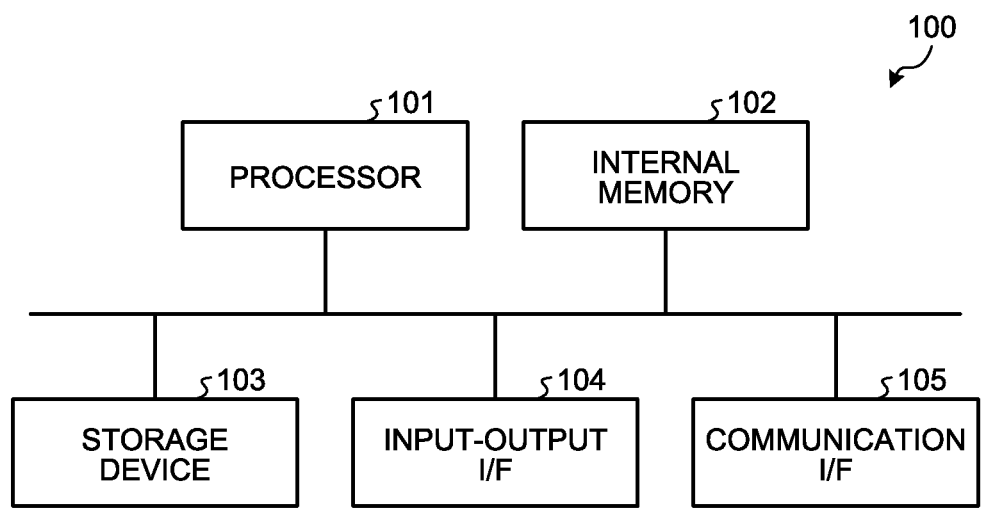
FIG. 27 is a block diagram illustrating an exemplary hardware configuration of the information processing device.

FIG. 27 is a block diagram illustrating an exemplary hardware configuration of the information processing device 100. For example, as illustrated in FIG. 27, the information processing device 100 has the hardware configuration of a general-purpose computer that includes a processor 101 such as a central processing unit (CPU) or a graphics processing unit (GPU); an internal memory 102 such as a random access memory (RAM) or a read only memory (ROM); a storage device 103 such as a hard disk drive (HDD) or a solid state drive (SSD); an input-output I/F 104 for establishing connection with various peripheral devices; and a communication I/F 105 for communicating with external devices. Then, for example, computer programs for making the computer run as the FBP execution environment are stored in the storage device 103; and, when the function node 180 and the persistent execution environment 190 are deployed from the programming environment of the FBP, those are stored in the storage device 103 or the internal memory 102.

The processor 101 reads, from the storage device 103, the computer programs for making the computer run as the FBP execution environment and executes the computer programs in the internal memory 102. As a result, the function node control unit 110 corresponding to the deployed function node 180 and the persistent execution unit 120 corresponding to the deployed persistent execution environment 190 are generated in the internal memory 102. Besides, if any processing node is deployed, then the control unit corresponding to that processing node is generated in the internal memory 102 in the same manner. The journal log storing unit 160 and the snapshot storing unit 170 are implemented using a memory device such as the storage device 103 or the internal memory 102.

The computer programs for making the computer run as the FBP execution environment are recorded in, for example, a magnetic disk (such as a flexible disk or a hard disk); an optical disk (such as a CD-ROM, a CD-R, a CD-RW, a DVD-ROM, a DVD±R, a DVD±RW, or a Blu-ray (registered trademark) disc); a semiconductor memory; or an equivalent recording memory. Herein, as long the recording medium in which the computer programs are recorded is a computer-readable recording medium; any storage format can be used. Alternatively, the computer programs can be made installable in advance in a computer; or the computer programs that are distributed via a network can be made installable in a computer.

Meanwhile, in the information processing device 100 according to the embodiments, some or all of the functional constituent elements can be implemented using dedicated hardware such as an application specific integrated circuit (ASIC) or a field-programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device that serves as a flow-based programming execution environment, comprising:
 a memory device; and
 a hardware processor connected to the memory device and configured to function as:
  a function node control unit that is disposed in a corresponding manner to a function node which is deployed from a programming environment; and
  a persistent execution unit:
   that is associated with the function node and that is disposed in a corresponding manner to a persistent execution environment which is deployed from the programming environment; and
   that comprises a virtual machine unit and a recovery unit, wherein the virtual machine unit:
    includes a global scope, in which a first variable declared in an initialization program of the persistent execution environment and a reserved variable of the persistent execution environment are registered;
    includes a function scope, which is generated at time of execution of the computer program, and in which a second variable declared in the computer program and a reserved variable of the function node are registered;
    includes an event listener node control unit that is disposed in a corresponding manner to an event listener node deployed from the programming environment; and
    includes an emit function that is stored in the reserved variable of the persistent execution environment;
  wherein when an input message of the function node is input, the function node control unit:
   records, as a journal log, a pair of the input message and a computer program defined in the function node, the journal log being recorded on the memory device; and
   sends the pair of the input message and the computer program to the virtual machine unit;
  the virtual machine unit:
   executes the computer program with the input message as an argument, wherein at time of execution of the computer program, the virtual machine unit:
    refers to variables in a sequential order of the second variable declared in the computer program, the reserved variable of the function node, the first variable declared in the initialization program, and the reserved variable of the persistent execution environment;
    executes the stored emit function in accordance with both the reserved variable of the function node and the reserved variable of the persistent execution environment;
    sends an event name and a message, which represent arguments of the emit function, to the event listener node control unit, based on the executed emit function, wherein when the event name received from the virtual machine unit matches with an event name defined in the event listener node, the event listener node control unit outputs the message received from the virtual machine unit; and based on the outputted message, sends an execution result to the function node control unit;

the function node control unit outputs the execution result, which is received from the virtual machine unit, as an output message; and at time of activation of the information processing device, the recovery unit:

restores the virtual machine unit to a state at a particular time in the past;

sequentially fetches journal logs recorded on the memory device after the particular time;

causes the virtual machine unit to sequentially re-execute computer programs, each of which constitutes one of the journal logs, with the input message constituting the journal log as an argument; and roll-forwards the virtual machine unit to a latest state.

2. The information processing device according to claim 1, wherein a plurality of function node control units is disposed corresponding to a plurality of function nodes deployed from the program environment, and the persistent execution unit is shared among the plurality of function node control units.

3. The information processing device according to claim 1, wherein the hardware processor is further configured to function as:

a template processing node control unit that is disposed in a corresponding manner to a template processing node deployed from the programming environment; and a read-only access unit that obtains a value of a variable registered in the global scope of the virtual machine unit, wherein when an input message of the template processing node is input, the template processing node control unit reads a value from the global scope of the virtual machine unit via the read-only access unit, with a variable name specified at an embedding position of template defined in the template processing node as a variable name of the variable registered in the global scope of the virtual machine unit, and outputs, as an output message, the template having the value embedded at the embedding position.

4. The information processing device according to claim 1, wherein the hardware processor is further configured to function as:

a read-only function node control unit:

that is disposed in a corresponding manner to a read-only function node deployed from the programming environment;

that, when an input message of the read-only function node is input, executes computer program, which is defined in the read-only function node, with the input message as an argument; and that outputs an execution result as an output message; and a read-only access unit that obtains a value of a variable registered in the global scope of the virtual machine unit, wherein at time of executing the computer program defined in the read-only function node, regarding reading from an undefined variable in the computer program, the read-only function node control unit reads a value from the global scope of the virtual machine unit via the read-only memory access unit.

5. An information processing system comprising:

the information processing device according to claim 1; and a reproduction device connected to the information processing device via a network, wherein the reproduction device comprises a memory device and a hardware processor connected to the memory device, the hardware processor being configured to function as:

a console unit that receives a user operation of specifying an arbitrary time in the past, and a state reproducing unit that:

reproduces, on the memory device of the reproduction device, a state of the virtual machine unit of the information processing device at a particular time older than the time specified by the user operation;

obtains, from the information processing device, journal logs recorded from the particular time to the time specified by the user operation;

sequentially executes, on the memory device of the reproduction device, computer programs, each of which constitutes one of the journal logs, with the input message constituting the journal log as an argument; and reproduces the state of the virtual machine unit of the information processing device at the time specified by the user operation.

6. The information processing system according to claim 5, wherein;

the hardware processor of the information processing device is further configured to function as a tagging unit that attaches a tag to each of the journal logs; and the console unit displays tags and receives user operation of specifying an arbitrary time in the past by selecting one of the displayed tags.

7. The information processing system according to claim 6, wherein the hardware processor of the information processing device is further configured to function as:

a tagging processing node control unit:

that is disposed in a corresponding manner to a tagging processing node deployed from the programming environment; and that, when an input message of the tagging processing node is input, sends a character string included in the input message to the tagging unit; and the tagging unit attaches the character string, which is received from the tagging processing node control unit, as the tag.

8. An information processing system that comprises a first information processing device and a second information processing device that are connected by a network and that are each serving as a flow-based programming execution environment:

wherein the first information processing device comprises a first hardware processor configured to function as a function node control unit that is disposed in a corresponding manner to a function node deployed in the first information processing device from a programming environment;

wherein the second information processing device comprises a memory device and a second hardware processor connected to the memory device;

wherein the second hardware processor is configured to function as a first persistent execution unit;

wherein the first persistent execution unit is associated with the function node and is disposed in a corresponding manner to a persistent execution environment;

wherein the persistent execution environment is deployed in the second information processing device from the programming environment and further comprises a virtual machine unit and a recovery unit, wherein the virtual machine unit:
  includes a global scope, in which a first variable declared in an initialization program of the persistent execution environment and a reserved variable of the persistent execution environment are registered;
  includes a function scope, which is generated at time of execution of the computer program, and in which a second variable declared in the computer program and a reserved variable of the function node are registered;
  includes an event listener node control unit that is disposed in a corresponding manner to an event listener node deployed from the programming environment; and
  includes an emit function that is stored in the reserved variable of the persistent execution environment;
wherein, when an input message of the function node is input, the function node control unit records, as a journal log, a pair of the input message and a computer program defined in the function node, and sends the pair of the input message and the computer program to the virtual machine unit, the journal loci being recorded on the memory device,
  wherein the virtual machine unit executes the computer program with the input message as an argument, wherein at time of execution of the computer program, the virtual machine unit:
    refers to variables in a sequential order of the second variable declared in the computer program, the reserved variable of the function node, the first variable declared in the initialization program, and the reserved variable of the persistent execution environment;
    executes the stored emit function in accordance with both the reserved variable of the function node and the reserved variable of the persistent execution environment;
    sends an event name and a message, which represent arguments of the emit function, to the event listener node control unit, based on the executed emit function, wherein when the event name received from the virtual machine unit matches with an event name defined in the event listener node, the event listener node control unit outputs the message received from the virtual machine unit; and
    based on the outputted message, sends an execution result to the function node control unit;
  wherein the function node control unit outputs the execution result, which is received from the virtual machine unit, as an output message; and
  wherein, at time of activation of the second information processing device, the recovery unit restores the virtual machine unit to a state at a particular time in the past;
    sequentially fetches journal logs recorded on the memory device after the particular time;
    causes the virtual machine unit to sequentially re-execute computer programs, each of which constitutes one of the journal logs, with the input message constituting the journal log as an argument; and
    roll-forwards the virtual machine unit to a latest state.

9. The information processing system according to claim 8, wherein the first hardware processor of the first processing device is further configured to function as:
  a second persistent execution unit associated with the function node that is disposed in a corresponding manner to the persistent execution environment deployed in the first information processing device from the programming environment, and that comprises a virtual machine unit and a recovery unit;
  when an input message of the function node is input, the function node control unit:
    records, as a journal log, a pair of the input message and a computer program defined in the function node;
    sends the input message and the computer program both to the virtual machine unit of the first persistent execution unit and to the virtual machine unit of the second persistent execution unit; and
    outputs, as an output message, one of the execution result received from the virtual machine unit of the first persistent execution unit and the execution result received from the virtual machine unit of the second persistent execution unit;
  at time of activation of the first information processing device, the recovery unit of the second persistent execution unit:
    restores the virtual machine unit of the second persistent execution unit to a state at a particular time in the past;
    sequentially fetches journal logs recorded after the particular time;
    causes the virtual machine unit of the second persistent execution unit to sequentially re-execute computer programs, each of which constitutes one of the journal logs, with the input message constituting the journal log as an argument; and
    roll-forwards the virtual machine unit of the second persistent execution unit to a latest state.

10. An information processing method implemented in an information processing device that serves as a flow-based programming execution environment, the information processing method comprising:
  when an input message of a function node, which is deployed in the information processing device from a programming environment, is input, recording, as a journal log, a pair of the input message and a computer program defined in the function node, the journal log being recorded on a memory device of the information processing device;
  in a virtual machine which is associated with the function node and which is disposed in a corresponding manner to a persistent execution environment deployed in the information processing device from the programming environment, wherein the virtual machine:
    includes a global scope, in which a first variable declared in an initialization program of the persistent execution environment and a reserved variable of the persistent execution environment are registered;
    includes a function scope, which is generated at time of execution of the computer program, and in which a second variable declared in the computer program and a reserved variable of the function node are registered;

includes an event listener node control unit that is disposed in a corresponding manner to an event listener node deployed from the programming environment; and includes an emit function that is stored in the reserved variable of the persistent execution environment;

executing, by the virtual machine, the computer program, with the input message as an argument, wherein executing the computer program comprises:

referring to variables in a sequential order of the second variable declared in the computer program, the reserved variable of the function node, the first variable declared in the initialization program, and the reserved variable of the persistent execution environment;

executing the stored emit function in accordance with both the reserved variable of the function node and the reserved variable of the persistent execution environment;

sending an event name and a message, which represent arguments of the emit function, to the event listener node control unit, based on the executed emit function, wherein when the event name received from the virtual machine unit matches with an event name defined in the event listener node, the event listener node control unit outputs the message received from the virtual machine unit; and based on the outputted message, sending an execution result to the function node control unit; and at time of activation of the information processing device:

restoring the virtual machine to a state at a particular time in the past:

sequentially fetching journal logs recorded on the memory device after the particular time:

causing the virtual machine to sequentially re-execute computer programs, each of which constitutes one of the journal logs, with the input message constituting the journal log as an argument: and roll-forwarding the virtual machine to a latest state.

11. A computer program product having a non-transitory computer readable medium including instructions, wherein the instructions, when executed by a computer that serves as a flow-based programming execution environment, cause the computer to:

when an input message of a function node, which is deployed in the information processing device from a programming environment, is input, record, as a journal log, a pair of the input message and a computer program defined in the function node, the journal log being recorded on a memory of the information processing device;

in a virtual machine which is associated with the function node and which is disposed in a corresponding manner to a persistent execution environment deployed in the information processing device from the programming environment, wherein the virtual machine:

includes a global scope, in which a first variable declared in an initialization program of the persistent execution environment and a reserved variable of the persistent execution environment are registered;

includes a function scope, which is generated at time of execution of the computer program, and in which a second variable declared in the computer program and a reserved variable of the function node are registered;

includes an event listener node control unit that is disposed in a corresponding manner to an event listener node deployed from the programming environment; and includes an emit function that is stored in the reserved variable of the persistent execution environment;

execute, by the virtual machine, the computer program with the input message as an argument, wherein execution of the computer program comprises steps to:

refer to variables in a sequential order of the second variable declared in the computer program, the reserved variable of the function node, the first variable declared in the initialization program, and the reserved variable of the persistent execution environment;

execute the stored emit function in accordance with both the reserved variable of the function node and the reserved variable of the persistent execution environment;

send an event name and a message, which represent arguments of the emit function, to the event listener node control unit, based on the executed emit function, wherein when the event name received from the virtual machine unit matches with an event name defined in the event listener node, the event listener node control unit outputs the message received from the virtual machine unit; and based on the outputted message, send an execution result to the function node control unit; and at time of activation of the information processing device:

restore the virtual machine to a state at a particular time in the past;

sequentially fetch journal logs recorded on the memory device after the particular time;

cause the virtual machine to sequentially re-execute computer programs, each of which constitutes one of the journal logs, with the input message constituting the journal log as an argument; and roll-forward the virtual machine to a latest state.

* * * * *